United States Patent
Gutman et al.

(10) Patent No.: US 12,132,554 B2
(45) Date of Patent: Oct. 29, 2024

(54) BEAM MANAGEMENT FEEDBACK COMPRESSION

(71) Applicant: QUALCOMM Incorporated, San Diego, CA (US)

(72) Inventors: Igor Gutman, Hod HaSharon (IL); Hua Wang, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 18/159,077

(22) Filed: Jan. 24, 2023

(65) Prior Publication Data

US 2024/0250736 A1 Jul. 25, 2024

(51) Int. Cl.
*H04B 7/06* (2006.01)
*H04W 72/20* (2023.01)
*H04W 72/542* (2023.01)

(52) U.S. Cl.
CPC .......... *H04B 7/0695* (2013.01); *H04W 72/20* (2023.01); *H04W 72/542* (2023.01)

(58) Field of Classification Search
CPC ... H04B 7/0695; H04W 72/20; H14W 72/542
See application file for complete search history.

(56) References Cited

U.S. PATENT DOCUMENTS

| | | | | |
|---|---|---|---|---|
| 2010/0079347 | A1* | 4/2010 | Hayes | H01Q 3/2682 343/705 |
| 2022/0231751 | A1* | 7/2022 | Grant | H04W 72/21 |
| 2022/0345196 | A1* | 10/2022 | Astrom et al. | H04B 7/0452 |
| 2023/0064199 | A1* | 3/2023 | Vieira | H04L 5/0023 |
| 2023/0216575 | A1* | 7/2023 | Tidestav | H04B 7/088 375/267 |
| 2024/0137178 | A1* | 4/2024 | Frenne | H04J 13/10 |
| 2024/0147256 | A1* | 5/2024 | Guthmann | H04W 72/232 |

* cited by examiner

*Primary Examiner* — Jaison Joseph
(74) *Attorney, Agent, or Firm* — Holland & Hart LLP

(57) ABSTRACT

Methods, systems, and devices for wireless communications are described. A first wireless device may receive, from a second wireless device and over a plurality of different beams, a set of reference signals as part of a beam management procedure. The first wireless device may select one or more bit values for indicating to the second wireless device a corresponding one or more individual beams of the plurality of different beams for communications between the first wireless device and the second wireless device, the one or more bit values selected based on a distribution of probabilities for switching between the plurality of different beams for the communications between the first wireless device and the second wireless device. The first wireless device may transmit control signaling indicating a ranking of the one or more individual beams for the communications between the first wireless device and the second wireless device.

30 Claims, 19 Drawing Sheets

|  | | 1st Beam | | | |
|---|---|---|---|---|---|
|  | | 305-a | 305-b | 305-c | 305-d |
| 2nd Beam | 305-a | NaN | 0.4 | 0.9 | 0.65 |
| | 305-b | 0.1 | NaN | 0.0 | 0.15 |
| | 305-c | 0.6 | 0.2 | NaN | 0.2 |
| | 305-d | 0.3 | 0.2 | 0.1 | NaN |

301

| | CRI 315-a | CRI 315-b | CRI 315-c | CRI 315-d |
|---|---|---|---|---|
| Report 310-a | 7 bits | X1 bits | X2 bits | X3 bits |

| | CRI 315-a | Delta CRI 320-a | Delta CRI 320-b | Delta CRI 320-c |
|---|---|---|---|---|
| Report 310-b | 7 bits | X1 bits | X2 bits | X3 bits |

302

405-a

| Codeword Index | Probability | Huffman Encoding |
|---|---|---|
| 0 | 30 | 11 |
| 1 | 30 | 10 |
| 2 | 30 | 01 |
| 3 | 5 | 001 |
| 4 | 3 | 0001 |
| 5 | 2 | 0000 |
| Average Bits | 2.15 | |

405-b

| Codeword Index | Probability | Huffman Encoding |
|---|---|---|
| 0 | 16.67 | 00 |
| 1 | 16.67 | 01 |
| 2 | 16.67 | 100 |
| 3 | 16.67 | 101 |
| 4 | 16.67 | 110 |
| 5 | 16.67 | 111 |
| Average Bits | 2.6666 | |

405-c

| Codeword Index | Probability | Huffman Encoding |
|---|---|---|
| 0 | 95 | 1 |
| 1 | 2 | 00 |
| 2 | 2 | 010 |
| 3 | 0.4 | 0111 |
| 4 | 0.3 | 01101 |
| 5 | 0.3 | 01100 |
| Average Bits | 1.1 | |

405-d

| Codeword Index | Probability | Huffman Encoding |
|---|---|---|
| 0 | 50 | 1 |
| 1 | 10 | 010 |
| 2 | 10 | 001 |
| 3 | 10 | 000 |
| 4 | 10 | 0111 |
| 5 | 10 | 0110 |
| Average Bits | 2.2 | |

| CRI 425-a | Codebook Selection 435 | Delta CRI 430-a | Delta CRI 430-b | Delta CRI 430-c |
|---|---|---|---|---|
| 7 bits | m bits | X1 bits | X2 bits | X3 bits |

BEAM MANAGEMENT FEEDBACK COMPRESSION

FIELD OF TECHNOLOGY

The following relates to wireless communications, including beam management feedback compression.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may include beamformed communications between a UE and a network entity, where the UE and network entity may perform a beam management procedure to determine one or more suitable beams for communications between the UE and the network entity.

SUMMARY

The described techniques relate to improved methods, systems, devices, and apparatuses that support beam management feedback compression. For example, the described techniques provide for beamforming feedback compression based on a probability distribution for switching from one beam to another.

A UE and a network entity may perform a beam management procedure where the UE may report to the network entity a set of most suitable beams (e.g., a set of the best beams) ranked by respective measured received signal received powers. The report may allow the network entity to determine an expected "new best beam" in case of dynamic environmental conditions (e.g., movement). In some examples, each report may include up to 7 bits per beam (e.g., 28 bits).

Beam reporting may be compressed so as to use fewer bits per report by reporting the most suitable beams using a combination of Huffman coding and delta reporting. Huffman coding allows for the most likely beam transitions to be encoded using the fewest quantity of bits. In Huffman coding, the event being encoded is evaluated to determine relative probabilities for each variation of the event. In the case of beam reporting, the Huffman encoding is based on the relative probabilities that a switch from one beam to another will occur. The most likely switches will be encoded with the fewest bits. Less likely switches may be encoded using more bits. However, for Huffman encoding to be effective, the encoding device and the decoding device are to have a same understanding of the distribution of probabilities from which the Huffman coding is based. Therefore, methods for ensuring that both a UE and a network entity have a same or similar distribution of probabilities for the encoding/decoding are described herein.

In some examples, the UE and the network entity may separately and autonomously manage a look-up table that reflects the distribution of probabilities. The table may be initiated (e.g., at the same time for the UE and the network entity) with uniform distribution (e.g., assuming that all beam switches are equally likely) and probability values in the table (e.g., at the same time for the UE and the network entity) may be updated using the average channel statistics of the last N reporting occasions. Thus, both the UE and the network entity may separately determine statistics and separately maintain the tables. In some other examples, a set of tables may be predefined at the UE and the network entity. The UE may determine a distribution of probabilities and may select a predefined table that is closest to the determined distribution. The UE may indicate the selected table to the network entity.

A method for wireless communication at a first wireless device is described. The method may include receiving, from a second wireless device and over a set of multiple different beams, a set of reference signals as part of a beam management procedure, selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device, and transmitting, to the second wireless device and using the one or more bit values, control signaling indicating a ranking of the one or more individual beams for the communications between the first wireless device and the second wireless device.

An apparatus for wireless communication at a first wireless device is described. The apparatus may include a processor, memory coupled with the processor, and instructions stored in the memory. The instructions may be executable by the processor to cause the apparatus to receive, from a second wireless device and over a set of multiple different beams, a set of reference signals as part of a beam management procedure, select one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device, and transmit, to the second wireless device and using the one or more bit values, control signaling indicating a ranking of the one or more individual beams for the communications between the first wireless device and the second wireless device.

Another apparatus for wireless communication at a first wireless device is described. The apparatus may include means for receiving, from a second wireless device and over a set of multiple different beams, a set of reference signals as part of a beam management procedure, means for selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device, and means for transmitting, to the second wireless device and using the one or more bit values, control signaling indicating a ranking of the one or more individual beams for the communications between the first wireless device and the second wireless device.

A non-transitory computer-readable medium storing code for wireless communication at a first wireless device is described. The code may include instructions executable by a processor to receive, from a second wireless device and over a set of multiple different beams, a set of reference signals as part of a beam management procedure, select one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device, and transmit, to the second wireless device and using the one or more bit values, control signaling indicating a ranking of the one or more individual beams for the communications between the first wireless device and the second wireless device.

Some examples of the method, apparatuses, and non-transitory computer-readable medium described herein may further include operations, features, means, or instructions for determining a table based on the distribution of probabilities, individual values of the table indicating a respective probability for switching between an individual beam of the set of multiple different beams and another beam of the set of multiple different beams, where the one or more bit values may be based on a Huffman coding of the table.

In some examples of the method, apparatuses, and non-transitory computer-readable medium described herein, determining the table based on the distribution of probabilities may include operations, features, means, or instructions for initiating the table based on a baseline distribution of probabilities, determining the distribution of probabilities over a quantity of reporting occasions based on measuring a signal quality of each beam of the set of multiple different beams, and updating the table based on the distribution of probabilities.

Some examples of the method, apparatuses, and non-transitory computer-readable medium described herein may further include operations, features, means, or instructions for receiving, from the second wireless device, information that may be indicative of a set of parameters for determining the distribution of probabilities.

In some examples of the method, apparatuses, and non-transitory computer-readable medium described herein, the set of parameters includes a start time for transitioning to beam report generation based on the distribution of probabilities, a quantity of time occasions to be evaluated in the determining of the distribution of probabilities, or both.

Some examples of the method, apparatuses, and non-transitory computer-readable medium described herein may further include operations, features, means, or instructions for receiving a positive acknowledgment via a physical uplink control channel from the second wireless device, where determining the distribution may be based on receipt of the positive acknowledgment.

In some examples of the method, apparatuses, and non-transitory computer-readable medium described herein, determining the table based on the distribution of probabilities may include operations, features, means, or instructions for determining the distribution of probabilities over a quantity of reporting occasions, comparing the distribution of probabilities with one or more predetermined distributions of probabilities that each correspond with one or more predetermined tables, and selecting the table from the one or more predetermined tables based on the comparing.

Some examples of the method, apparatuses, and non-transitory computer-readable medium described herein may further include operations, features, means, or instructions for transmitting an indication of the table to the second wireless device.

Some examples of the method, apparatuses, and non-transitory computer-readable medium described herein may further include operations, features, means, or instructions for receiving an indication of the one or more predetermined tables.

In some examples of the method, apparatuses, and non-transitory computer-readable medium described herein, the indication may be received via broadcast signaling, periodic broadcast signaling, layer 2 signaling, or layer 3 signaling, or any combination thereof.

In some examples of the method, apparatuses, and non-transitory computer-readable medium described herein, transmitting the control signaling that indicates the ranking of the one or more individual beams may include operations, features, means, or instructions for transmitting a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

Some examples of the method, apparatuses, and non-transitory computer-readable medium described herein may further include operations, features, means, or instructions for receiving, from the second wireless device, a signal indicative that the table from which the one or more bit values may be selected may be reset to a baseline distribution of probabilities.

Some examples of the method, apparatuses, and non-transitory computer-readable medium described herein may further include operations, features, means, or instructions for receiving, from the second wireless device, a signal indicative that the table from which the one or more bit values may be selected may be not to be autonomously updated by the first wireless device and receiving, from the second wireless device, one or more updates to the table.

Some examples of the method, apparatuses, and non-transitory computer-readable medium described herein may further include operations, features, means, or instructions for receiving, from the second wireless device, a signal indicative that the table from which the one or more bit values may be selected may be replaced by a second table indicated by the second wireless device.

In some examples of the method, apparatuses, and non-transitory computer-readable medium described herein, the signal may be received as a broadcast signal and the second table pertains to a set of multiple wireless devices that includes the first wireless device.

Some examples of the method, apparatuses, and non-transitory computer-readable medium described herein may further include operations, features, means, or instructions for receiving, from the second wireless device, a signal indicating that the first wireless device may be to autonomously update the table based on one or more measurements that trigger an update to the distribution of probabilities or, alternatively, select the table from one or more predetermined tables.

Some examples of the method, apparatuses, and non-transitory computer-readable medium described herein may further include operations, features, means, or instructions for transmitting, to the second wireless device, information indicating whether the first wireless device supports a set of functionalities associated with the distribution of probabilities.

In some examples of the method, apparatuses, and non-transitory computer-readable medium described herein, where the set of functionalities includes one or more of determining the distribution of probabilities, determining the distribution of probabilities based on average statistics associated with the set of multiple different beams, or selecting a table indicating the distribution of probabilities from a set of tables.

In some examples of the method, apparatuses, and non-transitory computer-readable medium described herein, transmitting the control signaling indicating the ranking of the one or more individual beams for the communications between the first wireless device and the second wireless device may include operations, features, means, or instructions for transmitting, as the control signaling, one or both of a channel status information reference signal (CSI-RS) resource indicator (CRI) or a synchronization signal block (SSB) resource indicator (SSB-RI).

A method for wireless communication at a second wireless device is described. The method may include determining, in connection with a beam management procedure, a distribution of probabilities for switching between different beams used for communicating between a first wireless device and the second wireless device, transmitting, to the first wireless device and over the different beams, a set of reference signals as part of the beam management procedure, and receiving, from the first wireless device, control signaling including one or more bit values indicating a ranking of one or more individual beams for communications between the first wireless device and the second wireless device, the one or more bit values based on the distribution of probabilities.

An apparatus for wireless communication at a second wireless device is described. The apparatus may include a processor, memory coupled with the processor, and instructions stored in the memory. The instructions may be executable by the processor to cause the apparatus to determine, in connection with a beam management procedure, a distribution of probabilities for switching between different beams used for communicating between a first wireless device and the second wireless device, transmit, to the first wireless device and over the different beams, a set of reference signals as part of the beam management procedure, and receive, from the first wireless device, control signaling including one or more bit values indicating a ranking of one or more individual beams for communications between the first wireless device and the second wireless device, the one or more bit values based on the distribution of probabilities.

Another apparatus for wireless communication at a second wireless device is described. The apparatus may include means for determining, in connection with a beam management procedure, a distribution of probabilities for switching between different beams used for communicating between a first wireless device and the second wireless device, means for transmitting, to the first wireless device and over the different beams, a set of reference signals as part of the beam management procedure, and means for receiving, from the first wireless device, control signaling including one or more bit values indicating a ranking of one or more individual beams for communications between the first wireless device and the second wireless device, the one or more bit values based on the distribution of probabilities.

A non-transitory computer-readable medium storing code for wireless communication at a second wireless device is described. The code may include instructions executable by a processor to determine, in connection with a beam management procedure, a distribution of probabilities for switching between different beams used for communicating between a first wireless device and the second wireless device, transmit, to the first wireless device and over the different beams, a set of reference signals as part of the beam management procedure, and receive, from the first wireless device, control signaling including one or more bit values indicating a ranking of one or more individual beams for communications between the first wireless device and the second wireless device, the one or more bit values based on the distribution of probabilities.

Some examples of the method, apparatuses, and non-transitory computer-readable medium described herein may further include operations, features, means, or instructions for determining a table based on the distribution of probabilities, replaced by a second table indicated by the second wireless device.

In some examples of the method, apparatuses, and non-transitory computer-readable medium described herein, the signal may be transmitted as a broadcast signal and the second table pertains to a set of multiple wireless devices that includes the first wireless device.

Some examples of the method, apparatuses, and non-transitory computer-readable medium described herein may further include operations, features, means, or instructions for transmitting, to the first wireless device, a signal indicating that the first wireless device may be to autonomously update the table based on one or more measurements that trigger an update to the distribution of probabilities or, alternatively, select the table from one or more predetermined tables.

Some examples of the method, apparatuses, and non-transitory computer-readable medium described herein may further include operations, features, means, or instructions for receiving, from the first wireless device, information indicating whether the first wireless device supports a set of functionalities associated with determining a second distribution of probabilities.

In some examples of the method, apparatuses, and non-transitory computer-readable medium described herein, where the set of functionalities includes one or more of determining the second distribution of probabilities, determining the second distribution of probabilities based on average statistics associated with the different beams, or selecting a table indicating the second distribution of probabilities from a set of tables.

In some examples of the method, apparatuses, and non-transitory computer-readable medium described herein, receiving the control signaling indicating the ranking of the one or more individual beams for the communications between the first wireless device and the second wireless device may include operations, features, means, or instructions for receiving, as the control signaling, at least one of a channel status information reference signal (CSI-RS)

resource indicator (CRI) or a synchronization signal block (SSB) resource indicator (SSB-RI).

BRIEF DESCRIPTION OF THE DRAWINGS

FIG. 4A illustrates an example of a Huffman coding scheme that supports beam management feedback compression in accordance with one or more aspects of the present disclosure.

FIG. 4B illustrates an example of a feedback report that supports beam management feedback compression in accordance with one or more aspects of the present disclosure.

DETAILED DESCRIPTION

Figure 1:
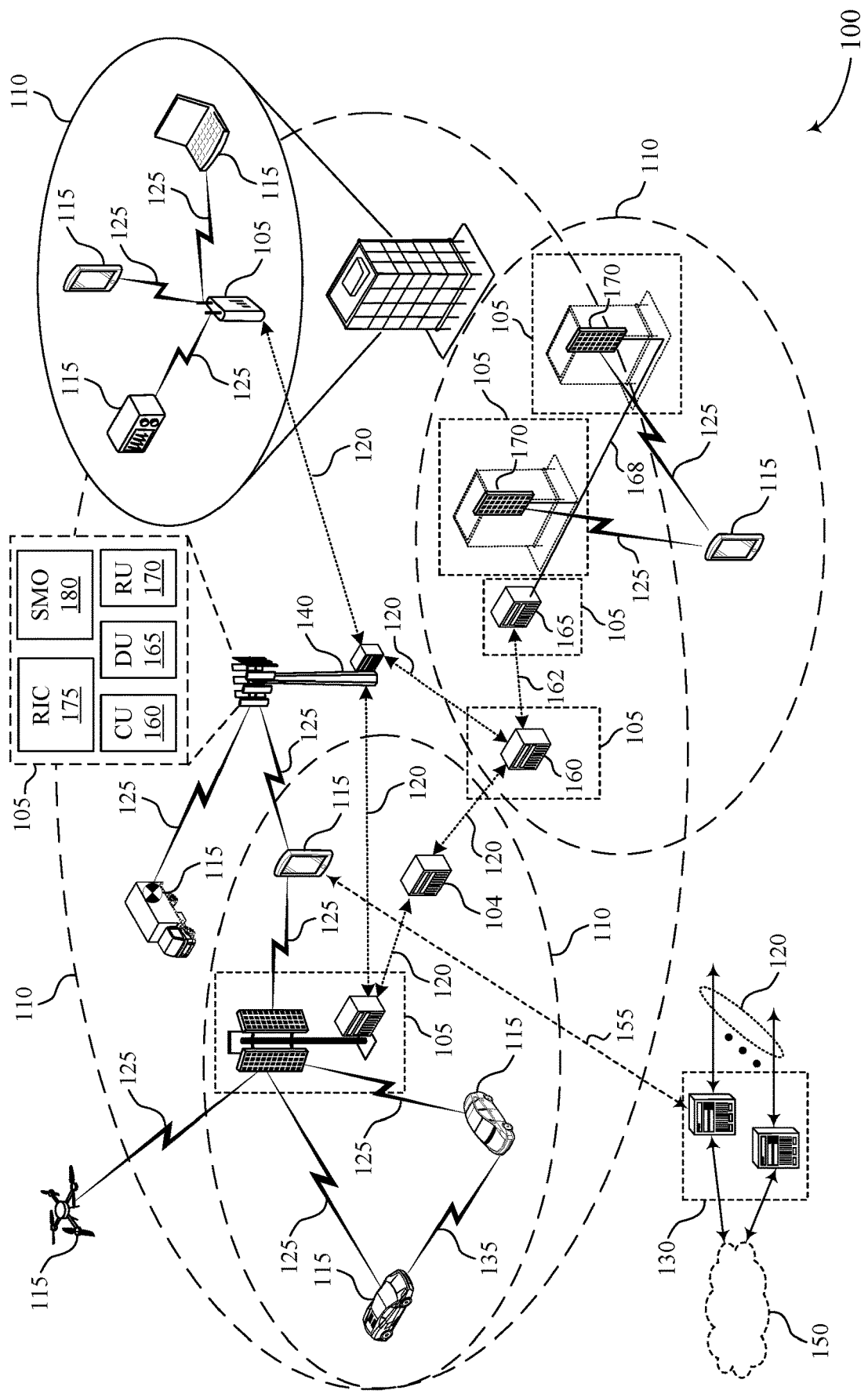
FIG. 1 illustrates an example of a wireless communications system that supports beam management feedback compression in accordance with one or more aspects of the present disclosure.

In some wireless communications systems, in order to select a most suitable communication beam for communications between a network entity and a UE, a UE and a network entity may perform a beam measurement procedure. For example, a UE may receive a set of reference signals from a network entity using a set of communication beams via a set of resources. The UE may measure the communication beams and may transmit a signal quality (e.g., reference signal received power (RSRP)) report including results of the beam measurement procedure. In some examples, the report may include information related to a set of downlink reference signals (e.g., channel state information reference signals (CSI-RSs), synchronization signal blocks (SSBs)) transmitted by the network entity using the set of communication beams via the set of resources such that the network entity may identify a most suitable communication beam based on the report including an indication of the resources (e.g., CSI-RS resource indicator (CRI), SSB resource indicator (SSB-RI)) via which the most suitable beam is communicated. For example, the UE may include an indication of a resource corresponding to a measured reference signal having a relatively high received power and the network entity may identify the beam corresponding to the resource indicated for communications with the UE.

In some examples, the report may include information (e.g., beam identity information, received power) for a subset of beams including a quantity of beams (e.g., four beams) identified as the most suitable beams among the set. As such, reliability and quality in the wireless communications system may be increased because the information provided in the report may support estimation of an expected "new" most suitable beam for beam transition in the case that the signal quality of the previously most suitable beam degrades. The report may include a quantity of bits dedicated to different types of resource indicators. For instance, the UE may transmit a report to the network entity that includes a quantity of bits for each indicated beam (e.g., up to 6 bits per beam for reporting SSB-RIs or up to 7 bits per beam for reporting CRIs), among other bits dedicated to other reported information. However, each report transmitted by the UE may incur significant overhead due to the large quantity of bits (e.g., 28 bits allocated to four beams in the case of CRIs), and thus optimization of these reports may conserve resources, and reduce latency, among other benefits. A likelihood that the network entity will transition from the most suitable beam to another beam indicated in the report may be different for each beam and thus exploitation of the non-uniform transition probability may decrease overhead of the report while maintaining performance.

Accordingly, techniques described herein may support methods for indicating compressed CRI/SSB-RI feedback. In some examples, a UE and a network entity may each determine and reference a table (e.g., a look-up table) which may serve as a baseline for Huffman coding and decoding. For example, the table may indicate a probability of the network entity transitioning from any first beam of a set of beams indicated in the report to any second beam of the set of beams indicated in the report. Additionally, or alternatively, the report may report the most suitable beams using delta reporting. For example, the report may indicate a CRI/SSB-RI for the most suitable beam and may report the difference in CRI/SSB-RI for each of the remaining beams in the report in relation to the most suitable beam or other beams in the report (e.g., a beam index reported in a previous field) and the table may indicate a sequence of bits associated with each beam of the set of beams, where the quantity of bits in each sequence of bits is correlated with the transition probability (e.g., the most likely beam transitions may be encoded with the fewest bits) and/or the delta CRI/SSB-RI between successively reported beam indices. Thus, a CRI/SSB-RI report for the most suitable beams (e.g., for four beams of the set of beams with the highest transition probability) may have less (e.g., than 28) bits and may therefore incur less overhead. However, for the use of Huffman coding to be effective, the network entity and the UE are to reference a same table.

In some examples, the UE and the network entity may separately and autonomously manage a look-up table that reflects the distribution of probabilities. That is, the network entity and the UE may initialize the table with a normal distribution (e.g., equal probabilities). Periodically, the network entity and the UE may update the table (e.g., dynamically) using the average statistics measured from a previous quantity of reporting occasions (e.g., the last N reporting occasions). In some examples, the UE may refrain from updating the table until it receives an acknowledgment from the network entity, or vice versa, ensuring the UE and the network entity may each reference the same table.

In some other examples, the network entity and the UE may be configured with a quantity of (e.g., four) predefined tables. The UE may select (e.g., dynamically) a table of the quantity of predefined tables which may incur the least amount of overhead based on correlation to the actual transition probabilities. In some such examples, the CRI/SSB-RI report for the most suitable beams may include an additional field (e.g., m bits) indicating which table of the quantity of predefined tables the UE selected.

Aspects of the disclosure are initially described in the context of wireless communications systems. Aspects of the disclosure are further described in the context of a look-up table, feedback reports and Huffman coding schemes. Aspects of the disclosure are further illustrated by and described with reference to apparatus diagrams, system diagrams, and flowcharts that relate to beam management feedback compression.

FIG. 1 illustrates an example of a wireless communications system 100 that supports beam management feedback compression in accordance with one or more aspects of the present disclosure. The wireless communications system 100 may include one or more network entities 105, one or more UEs 115, and a core network 130. In some examples, the wireless communications system 100 may be an LTE network, an LTE-A network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support beam management feedback compression as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

In some examples, feedback for beam selection may indicate a probability for switching from a most suitable beam to a next beam in the case of volatile communications systems. Due to the uneven distribution of probability for these switching events, the feedback may be encoded using Huffman coding. In Huffman coding, the higher the probability of an event, the less resources may be used to transmit the associated feedback. According to the Huffman coding, a binary tree may be generated from left to right selecting the two least probable events and aggregating them to form another equivalent event having a probability that equals the sum of the two events. The process may be repeated until there is a single event. The tree may be interpreted, from right to left, assigning different bits to different branches according to the Huffman coding. For example, in a four event situation, the most likely event (E1) may be represented by 0 and the remaining events (E2, E3, and E4) may first be represented by a multi-bit feedback starting with 1. Out of E2, E3, and E4, if E2 is most likely then it may be represented by 10 and E3 and E4 may be represented by multi-bit feedback starting with 11. Out of E3 and E4, if E3 is most likely then it may be represented by 110 and E4 may be represented by 111. That is, the most probable outcome of the event may be represented by feedback having the fewest bits, the second most probable outcome of the event may be represented by feedback having the next fewest bits and so on until the least probable outcome of the event which may be represented by feedback having the most bits. Thus, the accumulated feedback may be minimized thereby conserving resources.

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support beam management procedures for selecting a most suitable communication beam between a network entity 105 and a UE 115. For example, the UE 115 may transmit a signal quality feedback (e.g., including RSRP measurements) report including information related to a set of downlink reference signals (e.g., CSI-RSs, SSBs) received via a set of communication beams. The feedback report may include measured received powers for the set of communication beams and one or more indications (e.g., CRI, SSB-RIs) of which resources were used by the UE 115 to measure the received power of the communication beams such that the network entity 105 may identify a most suitable communication beam based on the indication of resources. For example, the network entity 105 may identify a beam corresponding to a resource indicated as being associated with a relatively high received power.

The report may include a quantity of bits dedicated to different types of resource indicators. For instance, the UE 115 may transmit a report to the network entity 105 that includes up to 6 bits for reporting SSB-RI or up to 7 bits for reporting CRI, or both, in some examples, among other bits dedicated to other reported information. In some examples, the UE 115 may be configured to monitor multiple beams and the CRI/SSB-RI may indicate the beam (e.g., corresponding to CSI-RS/SSB) that is identified by the UE 115 as a most suitable beam for communications between the UE 115 and the network entity 105. The report may, in some examples, include information (e.g., beam identity information, received power) for a subset of beams including a quantity of beams (e.g., up to four beams or in some examples even more) identified as the most suitable beams among the set. As such, reliability and quality may be increased because the information provided in the report may provide information to the network entity 105 that supports estimation of an expected "new" most suitable beam.

For example, a most suitable beam between the UE 115 and the network entity may degrade in signal quality for various reasons (e.g., movement of the UE 115, weather, obstacles) and as such a network entity 105 may autonomously select a new communication beam which bypasses performing an additional beam management procedure to determine which beam is most suitable. Instead, the network entity 105 may estimate a new most suitable beam based on the reported information on the subset of beams to which to transition downlink communications with the UE 115.

Each report transmitted by the UE 115 may incur significant overhead because each beam may correspond to a quantity of bits for each beam (e.g., up to 7 which in the example with 4 beams would incur a 28 bit report) and thus optimization of these reports may conserve resources, reduce latency, among other benefits.

A likelihood that the network entity 105 will transition from the most suitable beam to another beam indicated in the port may be different for each beam and thus exploitation of the non-uniform transition probability may decrease overhead of the feedback report while maintaining performance.

For example, the UE 115 may receive, from the network entity 105 and over a plurality of different beams, a set of reference signals as part of a beam management procedure and may select one or more bit values for indicating to the network entity 105 a corresponding one or more individual beams of the plurality of different beams for communications between the UE 115 and the network entity 105, the one or more bit values selected based on a distribution of probabilities for switching between the plurality of different beams for the communications between the UE 115 and the network entity 105. The UE 115 may transmit, to the network entity 105 and using the one or more bit values, control signaling indicating a ranking of the one or more individual beams for the communications between the UE 115 and the network entity 105.

The UE 115 or the network entity 105, or both may determine a table based on the distribution of probabilities, individual values of the table indicating a respective probability for switching between an individual beam of the plurality of different beams and another beam of the plurality of different beams, where the one or more bit values are based on a Huffman coding of the table. The UE 115 may initiate the table based on a baseline distribution of probabilities. In some examples, the UE 115 may determine the distribution of probabilities over a quantity of reporting occasions based at least in part on measuring a signal quality of each beam of the plurality of different beams and may update the table based on the distribution of probabilities. In some examples, the UE 115 may determine the distribution of probabilities over a quantity of reporting occasions. The UE 115 may compare the distribution of probabilities with one or more predetermined distributions of probabilities that each correspond with one or more predetermined tables and may select the table from the one or more predetermined tables based on the comparing.

Figure 2:
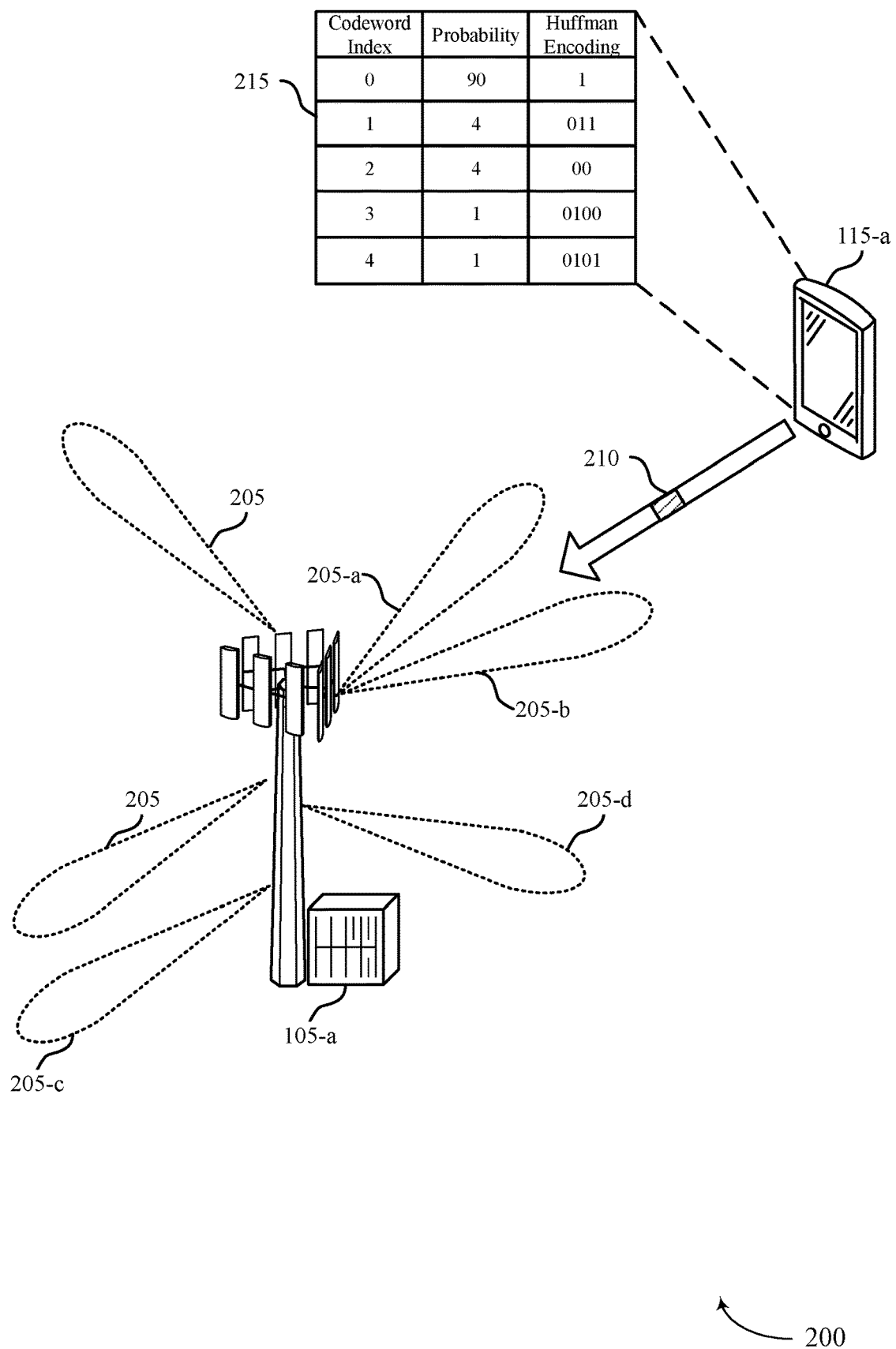
FIG. 2 illustrates an example of a wireless communications system that supports beam management feedback compression in accordance with one or more aspects of the present disclosure.

FIG. 2 illustrates an example of a wireless communications system 200 that supports beam management feedback compression in accordance with one or more aspects of the present disclosure. the wireless communications system 200 may include a UE 115-a and a network entity 105-a which may be examples of the corresponding device as described with reference to FIG. 1.

In some examples of the wireless communications system 200, the UE 115-a as part of a beam management procedure for selecting a most suitable communication beam 205 for communications between the network entity 105-a and the UE 115-a, the UE 115-a and the network entity 105-a may perform a beam measurement procedure. For example, the UE 115-a may receive a set of downlink reference signals from the network entity 105-a using a set of communication beams 205 via a set of resources. The UE 115-a may measure the communications beams 205 and may transmit a signal quality (e.g., RSRP) feedback report 210 including results of the beam measurement procedure. In some examples, the feedback report 210 may include information related to the set of downlink reference signals (e.g., CSI-RSs, SSBs) transmitted by the network entity 105-a using the set of communication beams 205 via the set of resources such that the network entity 105-a may identify a most suitable communication beam 205-a based on the report 210 including an indication of the resources (e.g., CRI, SSB-RI) via which the most suitable beam 205-a communicated. For example, the UE 115-a may include an indication of a resource corresponding to a measured reference signal having a relatively high received power and the network entity 105-a may identify the beam 205 corresponding to the resource indicated for communications with the UE 115-a.

In some examples, the report 210 may include information (e.g., beam identity information, received power) for a subset of beams 205-a, 205-b, 205-c, and 205-d identified as the most suitable beams 205 among the set. As such, reliability and quality in the wireless communications system may be increased because the information provided in the report 210 may support estimation of an expected "new" most suitable beam for beam transition in the case that the signal quality of the previously most suitable beam 205-a degrades. The report 210 may include a quantity of bits dedicated to different types of resource indicators. For instance, the UE 115-a may transmit a report 210 to the network entity 105-a that includes a quantity of bits for each indicated beam 205-a, 205-b, 205-c, and 205-d (e.g., up to 6 bits per beam 205-a, 205-b, 205-c, and 205-d for reporting SSB-RIs or up to 7 bits per beam 205-a, 205-b, 205-c, and 205-d for reporting CRIs), among other bits dedicated to other reported information. However, each report 210 transmitted by the UE 115-a may incur significant overhead due to the large quantity of bits (e.g., 28 bits allocated to four beams 205-a, 205-b, 205-c, and 205-d in the case of CRIs), and thus optimization of the report 210 may conserve resources, and reduce latency, among other benefits. However, a likelihood that the network entity 105-a will transition from a first beam 205 to another beam 205 indicated in the report 210 may be different for each of beam 205-a, 205-b, 205-c, and 205-d and thus exploitation of the non-uniform transition probability may decrease overhead of the report 210 while maintaining performance.

Accordingly, techniques described herein may support methods for indicating compressed CRI/SSB-RI feedback. In some examples, the UE 115-*a* and the network entity 105-*a* may each determine and reference a table (e.g., a look-up table) which may serve as a baseline for Huffman encoding and decoding based on a Huffman coding scheme 215. For example, the table may indicate a probability of the network entity 105-*a* transitioning from any first beam 205 of the set of beams 205-*a*, 205-*b*, 205-*c*, and 205-*d* indicated in the report 210 to any second beam 205 of the set of beams 205-*a*, 205-*b*, 205-*c*, and 205-*d* indicated in the report 210. Additionally, or alternatively, the report 210 may use delta reporting to report the set of beams 205-*a*, 205-*b*, 205-*c*, and 205-*d*. For example, the report 210 may indicate a beam index for the most suitable beam 205-*a* based on the beam's CRI/SSB-RI. The report 210 may also indicate the beam indices for other suitable beams 205-*b*, 205-*c*, 205-*d* using a delta value with respect to one of the other beams 205-*a* and the other beams 205-*b*, 205-*c*, 205-*d*. The table may indicate a sequence of bits associated with each beam of the set of beams 205-*a*, 205-*b*, 205-*c*, 205-*d* and determined based on the Huffman coding scheme, where the quantity of bits in each sequence of bits is correlated with the transition probability (e.g., the most likely beam transitions may be encoded with the fewest bits) and/or the delta reporting. Thus, a CRI/SSB-RI report 210 for the most suitable beams 205-*a*, 205-*b*, 205-*c*, 205-*d* (e.g., for four beams of the set of beams 205 with the highest RSRP) may have less (e.g., than 28) bits and may therefore incur less overhead.

Figure 3A:
FIG. 3A illustrates an example of a look-up table that supports beam management feedback compression in accordance with one or more aspects of the present disclosure.

FIG. 3A illustrates an example of a look-up table 301 that supports beam management feedback compression in accordance with one or more aspects of the present disclosure. The look-up table 301 may illustrate a two-dimensional table of probabilities for switching from a first beam 305 to a second beam 305. The look-up table may support Huffman encoding and delta encoding of feedback for a beam management procedure.

For the use of Huffman coding to be effective, a network entity 105 (which may be an example of the corresponding device as described with reference to FIGS. 1 & 2) and a UE 115-*a* (which may be an example of the corresponding device as described with reference to FIGS. 1 & 2) may reference a same look-up table.

In some examples, the UE 115 and the network entity 105 may separately and autonomously manage a look-up table that reflects the distribution of probabilities. That is, the network entity 105 and the UE 115 may initiate the table 301 with a normal distribution (e.g., equal probabilities). Periodically, the network entity 105 and the UE 115 may update the table 301 (e.g., dynamically) using the average statistics measured from a previous quantity of reporting occasions (e.g., the last N reporting occasions). In some examples, the UE 115 may refrain from updating the table until it receives an acknowledgment from the network entity 105, or vice versa, ensuring the UE 115 and the network entity 105 may each reference the same table 301.

The UE 115 and the network entity 105 may separately but simultaneously manage the look up table 301 in real time which may serve as a baseline for Huffman coding and decoding as described with reference to FIG. 2. For example, each of the UE 115 and the network entity 105 may construct a relative distribution of probabilities for beam switching in which the distribution may be a basis for encoding and decoding a CRI/SSB-RI report.

For instance, in the case of a four-beam report use case. Table 301 may show a respective probability for transitioning from beam 305-*a* to beam 305-*b*, 305-*c* and 305-*d*, a respective probability for transitioning from beam 305-*b* to beam 305-*a*, 306-*c*, and 305-*d*, a respective probability for transitioning from beam 305-*c* to beam 305-*a*, 305-*b*, and 305-*d*, and a respective probability for transitioning from beam 305-*d* to beam 305-*a*, 305-*b*, and 305-*c* or in other words a probability that the received power of a first beam will follow the received power of a second beam (e.g., assuming that all received powers of all beams are sorted. Each transition probability as shown in table 301 may be different and thus a quantity of bits for representing the delta CRI/SSB-RI for each beam may be different (e.g., and on average smaller than in the case of a uniform distribution).

For a UE 115 to encode the report and the network entity 105 to decode the report, a same table 301 may be available to both the UE 115 and the network entity 105. As such, the UE 115 and the network entity 105 may separately and simultaneously manage and adapt a distribution table in real time. Initially, the table at each of the UE 115 and the network entity 105 may have a uniform distribution and as time passes probability values in the table may be updated using a set of average channel statistics measured over a quantity of preceding reporting occasions.

Figure 3B:
FIG. 3B illustrates an example of a feedback reporting scheme that supports beam management feedback compression in accordance with one or more aspects of the present disclosure.

FIG. 3B illustrates an example of a feedback reporting scheme 302 that supports beam management feedback compression in accordance with one or more aspects of the present disclosure. The feedback reporting scheme 302 may illustrate CRI reports 310-*a* and 310-*b*

A feedback report 310 encoded with Huffman coding may include a variable quantity of bits used to indicate the delta CRI/SSB-RI from a first beam to a second beam. For uniform distributions, the report 310 may include a same quantity of bits in each field 315. For example, each of CRI fields 315-*a*, 315-*b*, 315-*c*, and 315-*d* may include up to 7 (e.g., or even more) bits. For a non-uniform distribution without delta encoding, feedback report 310-*a* may include first field 315-*a* which may include a full quantity of bits (e.g., up to 7 or even more), second field 315-*b* which may include a quantity of bits that represent the Huffman coding of the CRI/SSB-RI for a transition between a first strongest beam to a second strongest beam, third field 315-*c* which may include a quantity of bits that represent the Huffman coding of the CRI/SSB-RI for a transition between the second strongest beam to a third strongest beam, and fourth field 315-*d* which may include a quantity of bits that represent the Huffman coding of the CRI/SSB-RI for a transition between a third strongest beam to a fourth strongest beam, and so on.

For a non-uniform distribution with delta encoding, the feedback report 310-*b* may include first field 315-*a* which may include a full quantity of bits (e.g., up to 7 or even more), second field 320-*a* which may include a quantity of bits that represent the delta CRI/SSB-RI for a transition between a first strongest beam to a second strongest beam, third field 320-*b* may include a quantity of bits that represent the delta CRI/SSB-RI for a transition between the second strongest beam to a third strongest beam, and fourth field 320-*c* which may include a quantity of bits that represent the delta CRI/SSB-RI for a transition between a third strongest beam to a fourth strongest beam, and so on.

In some examples, a report 310 may be Huffman encoded and delta encoded.

The UE 115 and the network entity 105 may update the probability distributions in the table 301 dynamically and in the example of a "static" channel (e.g., a channel with static or slowly changing conditions), Huffman encoding of the report 310 may provide the most significant gains in terms of bits conserved. In the example of a "dynamic" channel (e.g., a channel with quickly changing conditions) in which channel statistics are relatively unchanged then a quantity of bits conserved may be comparable those conserved in the static channel examples. However, the example of a dynamic channel having variable channel statistics, gains would still be significant however may be lesser when compared to gains of the static channel. In some such examples, signaling overhead may be temporarily increased while maintaining reliability and signal efficiency. In some examples, codding errors may occur in some instances (e.g., PUCCH failure) and the report may be delivered with errors which may cause probability mismatch between the table 301 managed by the UE 115 and the network entity 105 based on reporting occasion statistics and Huffman failure. However, such failure may be avoided by updating the table 301 when an ACK is received. In some examples, a loss in overhead my occur when compared to the base line solution of report 310-a (e.g., having a normal distribution), however, the UE 115 or the network entity 105 or both may identify such a situation and may bypass Huffman encoding and decoding of the report.

FIG. 4A illustrates an example of a Huffman coding scheme 401 that supports beam management feedback compression in accordance with one or more aspects of the present disclosure. The Huffman coding scheme 401 includes a set of preconfigured Huffman coding tables 405 for encoding and decoding.

For example, a network entity 105 and a UE 115 (which may be examples of the corresponding devices described with reference to FIGS. 1 & 2) may be configured with a quantity of (e.g., four) predefined tables 405. The UE115 may select (e.g., dynamically) a table 405-a, 405-b, 405-c, or 405-d of the quantity of predefined tables 405 which may incur the least amount of overhead based on correlation to the actual transition probabilities (e.g., as measured by the UE 115). In some such examples, the CRI/SSB-RI report for the most suitable beams may include an additional field (e.g., m bits) indicating which table 405-a, 405-b, 405-c, or 405-d of the quantity of predefined tables 405 the UE selected.

For example, the set of tables 405 may include hypothesizes of CRI/SSB-RI or delta CRI/SSB-RI distributions and the transmitting entity may select a table 405-a, 405-b, 405-c, or 405-d of the set of tables 405 having a hypothesis that is closest to an actual probability distribution based on statistics from a quantity of reporting occasions or that uses a least amount of overhead, or both. In some examples, one or more tables 405 having different distributions may define a same coding scheme.

FIG. 4B illustrates an example of a feedback report 402 that supports beam management feedback compression in accordance with one or more aspects of the present disclosure. The feedback report may include CRI field 425-a (which may be similar to or include information similar to CRI 315-a as described with reference to FIG. 3), delta CRI 430-a, delta CRI 430-b, and delta CRI 430-c (which may be similar to or include information similar to delta CRI 320-a, delta CRI 320-b, and delta CRI 320-c as described with reference to FIG. 3). The feedback report 402 may additionally include a codebook selection field 435 for indicating which table 405 of the plurality is used for the Huffman encoding of the report. In some such examples, this solution may avoid database management for autonomously determining a table as described with reference to FIGS. 3A and 3B.

Figure 5:
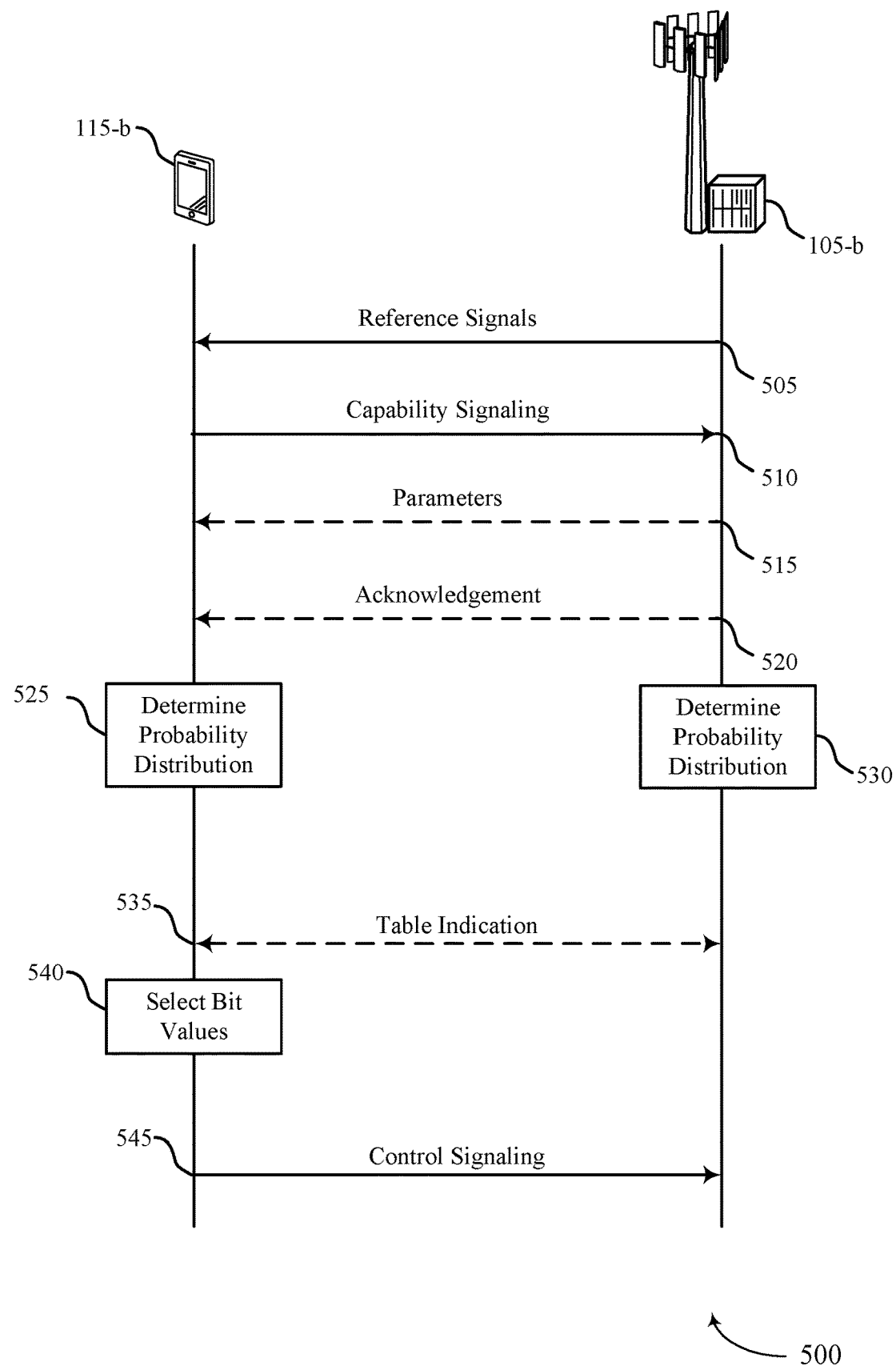
FIG. 5 illustrates an example of a process flow that supports beam management feedback compression in accordance with one or more aspects of the present disclosure.

FIG. 5 illustrates an example of a process flow 500 that supports beam management feedback compression in accordance with one or more aspects of the present disclosure. In some examples, the process flow 500 may implement or be implemented by aspects of the wireless communications system 100 and the wireless communications system 200. For example, the process flow 500 may include a network entity 105-b and UE 105-b, which may be examples of the corresponding devices as described with reference to FIG. 1. While the operations are described as occurring between the UE 115-b and the network entity 105-b, the operations may be performed by any device in any order and one or more operations may be added or omitted from the operations.

At 505, the network entity 105-b may transmit, to the UE 115-b, a set of reference signals via one or more directional communication beams as part of a beam management procedure. The set of reference signals may include, for example, a quantity of CSI-RS or SSB signals transmitted using a set of different communication beams via a set of resources. The UE 115-b may determine one or more characteristics of the set of communication beams based on measuring the received power of each reference signal in each resource. Based on the measuring, the UE 115-a may identify a subset of the set of communication beams having the relatively highest signal quality. For example, the UE 115-a may identify a most suitable communications beam for communications between the UE 115-b and the network entity 105-b, a second most suitable beam, a third most suitable beam, and so on.

In some examples, at 510, the UE 115-b may transmit, to the network entity 105-b, information indicating whether the UE 115-b supports a set of functionalities associated with the distribution of probabilities. The set of functionalities may include determining the distribution of probabilities, determining the distribution of probabilities based on average statistics associated with the plurality of different beams, or selecting a table indicating the distribution of probabilities from a set of tables. In some examples, the capability signaling may include layer 3 signaling.

In some cases, at 515, the network entity 105-b may transmit, to the UE 115-b, information indicative of a set of parameters for measuring channel statistics as part of a Huffman coding procedure for feedback compression. For example, the set of parameters may indicate when and for how long (among other examples) the UE 115-b is to measure channel statistics for managing a table of beam switching probabilities which may also be known as a probability distribution, such that the UE 115-b and the network entity 105-b may determine similar tables for Huffman coding and decoding. The set of parameters may include a start time for managing the table (e.g., a start time for measuring the channel statistics) or a quantity of reporting occasions for determining the distribution of probabilities (e.g., from channel statistics measured over the quantity of reporting occasions), or both. In some examples, the parameters may be transmitted via layer 2 or layer 3 signaling or both. Additionally, or alternatively, the network entity 105-b may signal to the UE 115-b which or a plurality of table management scheme to use (e.g., out of the table management scheme described with reference to FIGS. 3A & 3B or the predetermined table schemed described with reference to FIGS. 4A & 4B).

At 525 and 530, the UE 115-b or the network entity 105-b or both may determine a look-up table comprising a distribution of probabilities. In some examples, the UE 115-b may determine the distribution of probabilities over a quantity of reporting occasions based at least in part on receiving the parameters from the network entity 105-b. The distribution of probabilities may include, for example, probabilities for switching from a first beam of the set to each of the quantity of communication beams, and vice versa. The UE 115-*b* may determine a table based on the distribution of probabilities. For example, the UE 115-*b* may receive a signal from the network entity 105-*b* indicating for the UE 115-*b* to initiate the table based on a baseline distribution of probabilities, determine a new distribution of probabilities over a quality of reporting occasions, and update the table based on the new distribution of probabilities. Additionally, or alternatively, the UE 115-*b* may receive a signal from the network entity 105-*b* indicating for the UE 115-*b* to update the table based on one or more updates transmitted by the network entity 105-*b* (e.g., non-autonomously). Additionally, or alternatively, the UE 115-*b* may receive a signal from the network entity 105-*b* indicating for the table to be reset to the baseline distribution of probabilities.

In some other examples, at 520 or 525, the UE 115-*b* may determine the table by comparing the new distribution of probabilities with one or more predetermined distributions of probabilities corresponding with one or more predetermined tables and selecting one of the one or more predetermined tables based on the comparing. In some examples, the network entity 105-*b* may predefine the predetermined tables via offline/factory training or in online (by collecting statistics from different UEs 115). In some examples, the indication of the table from the set of tables may be transmitted via broadcast to a set of UEs 115. In some examples, the table may be overwritten by the network entity 105-*a* via layer 3 signaling at 535, or otherwise to the UE 115-*a* or a group of UEs 115 including the UE 115-*a*.

In some cases, at 515, the network entity 105-*b* may transmit, to the UE 115-*b*, a positive acknowledgment via a physical uplink control channel (PUCCH). The UE 115*b* may determine the distribution based at least in part on receiving the positive acknowledgment. For example, the UE 115-*a* may refrain from updating the table at 515 for one or more reporting occasions unless a positive feedback acknowledgement is received to ensure that the measured channel statistics at the network entity 105-*a* and 115-*a* are the same or similar.

Additionally, or alternatively, at 535, the UE 115-*b* may receive a signal from the network entity 105-*b* indicating for the table determined at 515 to be replaced by a second table indicated by the network entity 105-*b*. In some cases, at 535, the UE 115-*b* may transmit, to the network entity 105-*b*, an indication of the table. For example, the UE 115-*b* may transmit an indication of the table determined at step 525. In some cases, at 535, the network entity 105-*b* may transmit, to the UE 115-*b*, an indication of the table. For example, the network entity 105-*b* may transmit an indication of the table determined at step 530. The network entity 105-*b* may transmit the indication of the table, for example, via broadcast signaling, periodic broadcast signaling, layer 2 signaling, layer 3 signaling, or any combination thereof. This may be applicable, for example, if the network entity 105-*b* determines that a group of UEs 115 may have a same or similar set of channel statistics and determines to bypass convergence on a distribution of probabilities for the UE 115-*b*.

In some examples, at 535, the network entity 105-*b* may reset a table stored at the UE 115-*a* starting from a signaling occasion and return to a baseline solution (e.g., not including Huffman coding which may also be referred to as a non-statistical approach). Additionally, or alternatively, the network entity may transmit signaling that may instruct the UE 115-*b* to refrain from updating the table for any quantity of succeeding reporting occasions, such that the network entity 105-*b* is solely responsible for maintaining the table. In some such examples, the network entity 105-*b* may signal the network entity-managed table to the UE 115-*b* or a group of UEs 115 including the UE 115-*b* via broadcast signaling.

At 540, the UE 115-*b* may select bit values indicating a quantity of individual beams of the plurality of beams. The UE 115-*b* may select the one or more bit values based on the distribution of probabilities for switching beams. Additionally, or alternatively, the one or more bit values may be based on a Huffman coding of a table.

At 545, the UE 115-*b* may transmit, to the network entity 105-*b*, control signaling indicating a ranking of one or more individual beams (e.g., most suitable beams) of the plurality of beams for communication between the UE 115-*b* and the network entity 105-*b*. In some examples, the control signaling may include a report indicating the one or more bit values. The control signaling may be one or both of a CRI or a synchronization signal or physical broadcast channel (SS/PBCH) resource block indicator. The report may provide information for a subset of the set of beams identified as having a relative ranking that satisfies a threshold rank. For example, the report may include information for a quantity of the most suitable beams (e.g., up to four or even more best beams), where the information in the report is Huffman encoded, delta encoded or any combination thereof.

Figure 6:
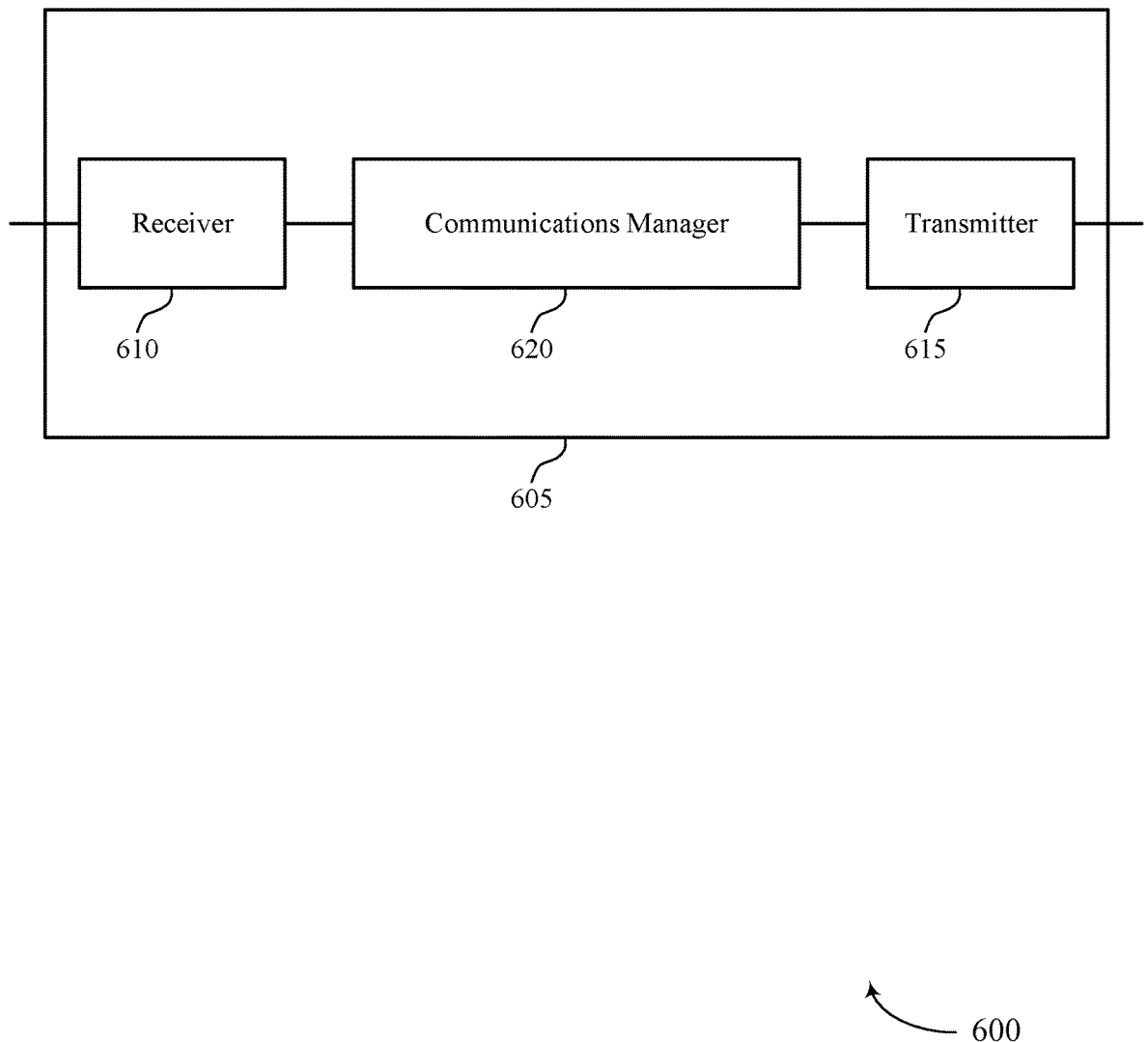
FIGS. 6 and 7 illustrate diagrams of devices that support beam management feedback compression in accordance with one or more aspects of the present disclosure.

FIG. 6 illustrates a diagram 600 of a device 605 that supports beam management feedback compression in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to beam management feedback compression). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to beam management feedback compression). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of beam management feedback compression as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first wireless device in accordance with examples as disclosed herein. For example, the communications manager 620 may be configured as or otherwise support a means for receiving, from a second wireless device and over a set of multiple different beams, a set of reference signals as part of a beam management procedure. The communications manager 620 may be configured as or otherwise support a means for selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The communications manager 620 may be configured as or otherwise support a means for transmitting, to the second wireless device and using the one or more bit values, control signaling indicating a ranking of the one or more individual beams for the communications between the first wireless device and the second wireless device.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources, among other examples.

Figure 7:
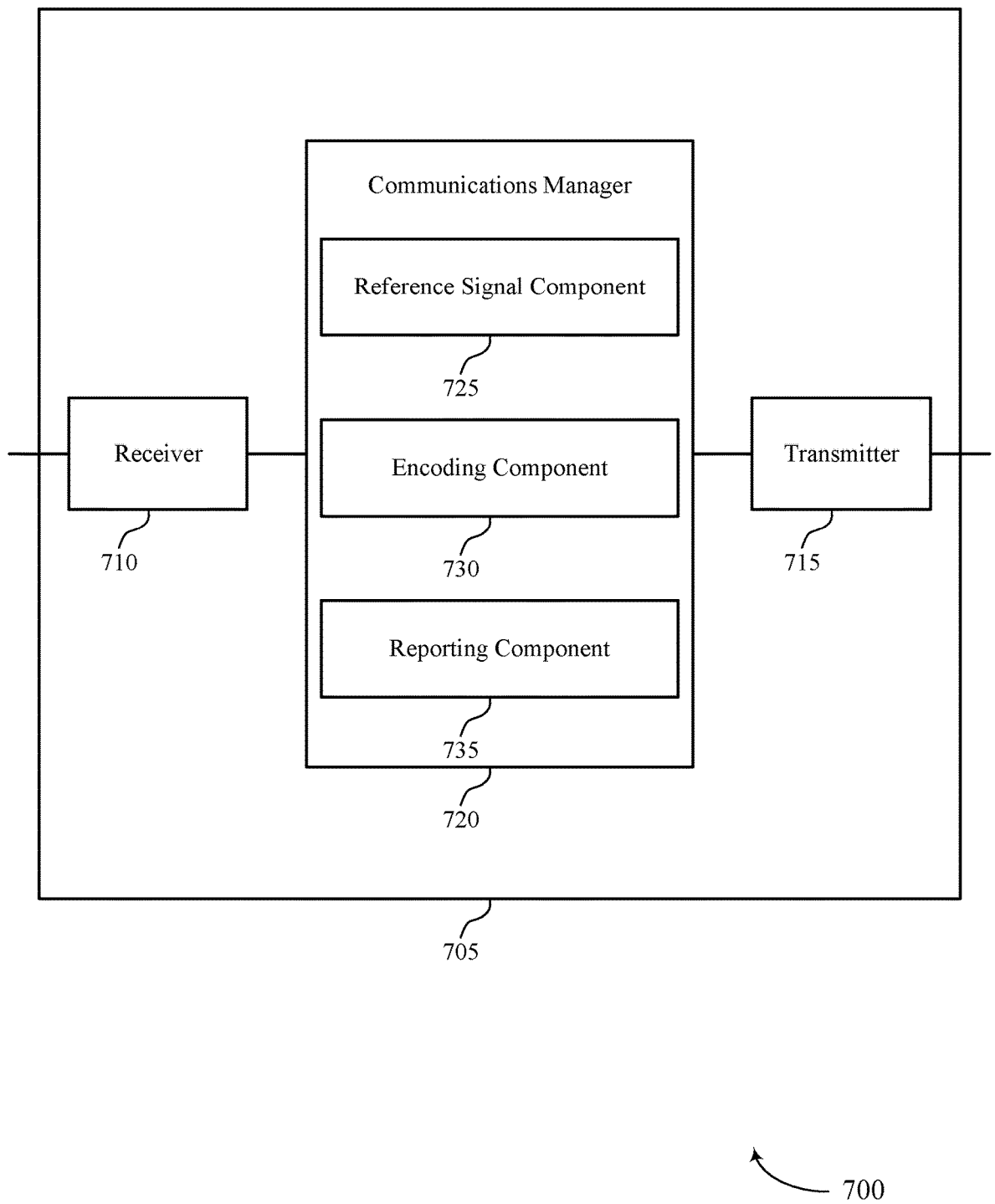

FIG. 7 illustrates a diagram 700 of a device 705 that supports beam management feedback compression in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam management feedback compression). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam management feedback compression). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of beam management feedback compression as described herein. For example, the communications manager 720 may include a reference signal component 725, an encoding component 730, a reporting component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first wireless device in accordance with examples as disclosed herein. The reference signal component 725 may be configured as or otherwise support a means for receiving, from a second wireless device and over a set of multiple different beams, a set of reference signals as part of a beam management procedure. The encoding component 730 may be configured as or otherwise support a means for selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The reporting component 735 may be configured as or otherwise support a means for transmitting, to the second wireless device and using the one or more bit values, control signaling indicating a ranking of the one or more individual beams for the communications between the first wireless device and the second wireless device.

Figure 8:
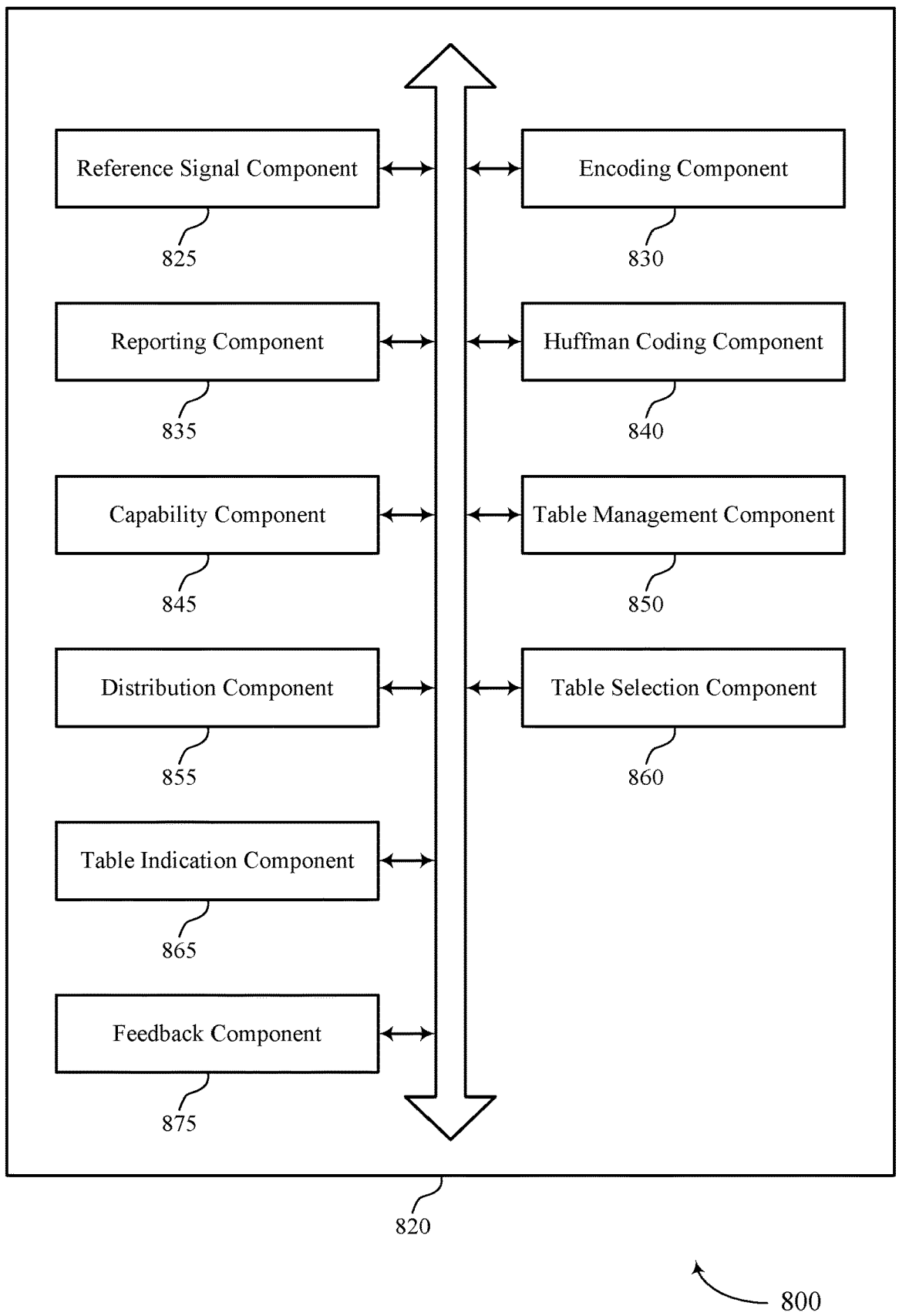
FIG. 8 illustrates a diagram of a communications manager that supports beam management feedback compression in accordance with one or more aspects of the present disclosure.

FIG. 8 illustrates a diagram 800 of a communications manager 820 that supports beam management feedback compression in accordance with one or more aspects of the present disclosure. The communications manager 820 may be an example of aspects of a communications manager 620, a communications manager 720, or both, as described herein. The communications manager 820, or various components thereof, may be an example of means for performing various aspects of beam management feedback compression as described herein. For example, the communications manager 820 may include a reference signal component 825, an encoding component 830, a reporting component 835, a Huffman coding component 840, a capability component 845, a table management component 850, a distribution component 855, a table selection component 860, a table indication component 865, a feedback component 875, or any combination thereof. Each of these components may communicate, directly or indirectly, with one another (e.g., via one or more buses).

The communications manager 820 may support wireless communication at a first wireless device in accordance with examples as disclosed herein. The reference signal component 825 may be configured as or otherwise support a means for receiving, from a second wireless device and over a set of multiple different beams, a set of reference signals as part of a beam management procedure. The encoding component 830 may be configured as or otherwise support a means for selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The reporting component 835 may be configured as or otherwise support a means for transmitting, to the second wireless device and using the one or more bit values, control signaling indicating a ranking of the one or more individual beams for the communications between the first wireless device and the second wireless device.

In some examples, the Huffman coding component 840 may be configured as or otherwise support a means for determining a table based on the distribution of probabilities, individual values of the table indicating a respective probability for switching between an individual beam of the set of multiple different beams and another beam of the set of multiple different beams, where the one or more bit values are based on a Huffman coding of the table.

In some examples, to support determining the table based on the distribution of probabilities, the table management component 850 may be configured as or otherwise support a means for initiating the table based on a baseline distribution of probabilities. In some examples, to support determining the table based on the distribution of probabilities, the distribution component 855 may be configured as or otherwise support a means for determining the distribution of probabilities over a quantity of reporting occasions based on measuring a signal quality of each beam of the set of multiple different beams. In some examples, to support determining the table based on the distribution of probabilities, the table management component 850 may be configured as or otherwise support a means for updating the table based on the distribution of probabilities.

In some examples, the distribution component 855 may be configured as or otherwise support a means for receiving, from the second wireless device, information that is indicative of a set of parameters for determining the distribution of probabilities.

In some examples, the set of parameters includes a start time for transitioning to beam report generation based on the distribution of probabilities, a quantity of time occasions to be evaluated in the determining of the distribution of probabilities, or both.

In some examples, the feedback component 875 may be configured as or otherwise support a means for receiving a positive acknowledgment via a physical uplink control channel from the second wireless device, where determining the distribution of probabilities is based on receipt of the positive acknowledgment.

In some examples, to support determining the table based on the distribution of probabilities, the distribution component 855 may be configured as or otherwise support a means for determining the distribution of probabilities over a quantity of reporting occasions. In some examples, to support determining the table based on the distribution of probabilities, the table selection component 860 may be configured as or otherwise support a means for comparing the distribution of probabilities with one or more predetermined distributions of probabilities that each correspond with one or more predetermined tables. In some examples, to support determining the table based on the distribution of probabilities, the table selection component 860 may be configured as or otherwise support a means for selecting the table from the one or more predetermined tables based on the comparing.

In some examples, the table indication component 865 may be configured as or otherwise support a means for transmitting an indication of the table to the second wireless device.

In some examples, the table indication component 865 may be configured as or otherwise support a means for receiving an indication of the one or more predetermined tables.

In some examples, the indication is received via broadcast signaling, periodic broadcast signaling, layer 2 signaling, or layer 3 signaling, or any combination thereof.

In some examples, to support transmitting the control signaling that indicates the ranking of the one or more individual beams, the reporting component 835 may be configured as or otherwise support a means for transmitting a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

In some examples, the table management component 850 may be configured as or otherwise support a means for receiving, from the second wireless device, a signal indicative that the table from which the one or more bit values are selected is to be reset to a baseline distribution of probabilities.

In some examples, the table indication component 865 may be configured as or otherwise support a means for receiving, from the second wireless device, a signal indicative that the table from which the one or more bit values are selected is not to be autonomously updated by the first wireless device. In some examples, the table management component 850 may be configured as or otherwise support a means for receiving, from the second wireless device, one or more updates to the table.

In some examples, the table indication component 865 may be configured as or otherwise support a means for receiving, from the second wireless device, a signal indicative that the table from which the one or more bit values are selected is to be replaced by a second table indicated by the second wireless device.

In some examples, the signal is received as a broadcast signal and. In some examples, the second table pertains to a set of multiple wireless devices that includes the first wireless device.

In some examples, the table management component 850 may be configured as or otherwise support a means for receiving, from the second wireless device, a signal indicating that the first wireless device is to autonomously update the table based on one or more measurements that trigger an update to the distribution of probabilities or, alternatively, select the table from one or more predetermined tables.

In some examples, the capability component 845 may be configured as or otherwise support a means for transmitting, to the second wireless device, information indicating whether the first wireless device supports a set of functionalities associated with the distribution of probabilities.

In some examples, the set of functionalities includes one or more of determining the distribution of probabilities, determining the distribution of probabilities based on average statistics associated with the set of multiple different beams, or selecting a table indicating the distribution of probabilities from a set of tables.

In some examples, to support transmitting the control signaling indicating the ranking of the one or more individual beams for the communications between the first wireless device and the second wireless device, the reporting component 835 may be configured as or otherwise support a means for transmitting, as the control signaling, one or both of a CRI or an SSB-RI.

Figure 9:
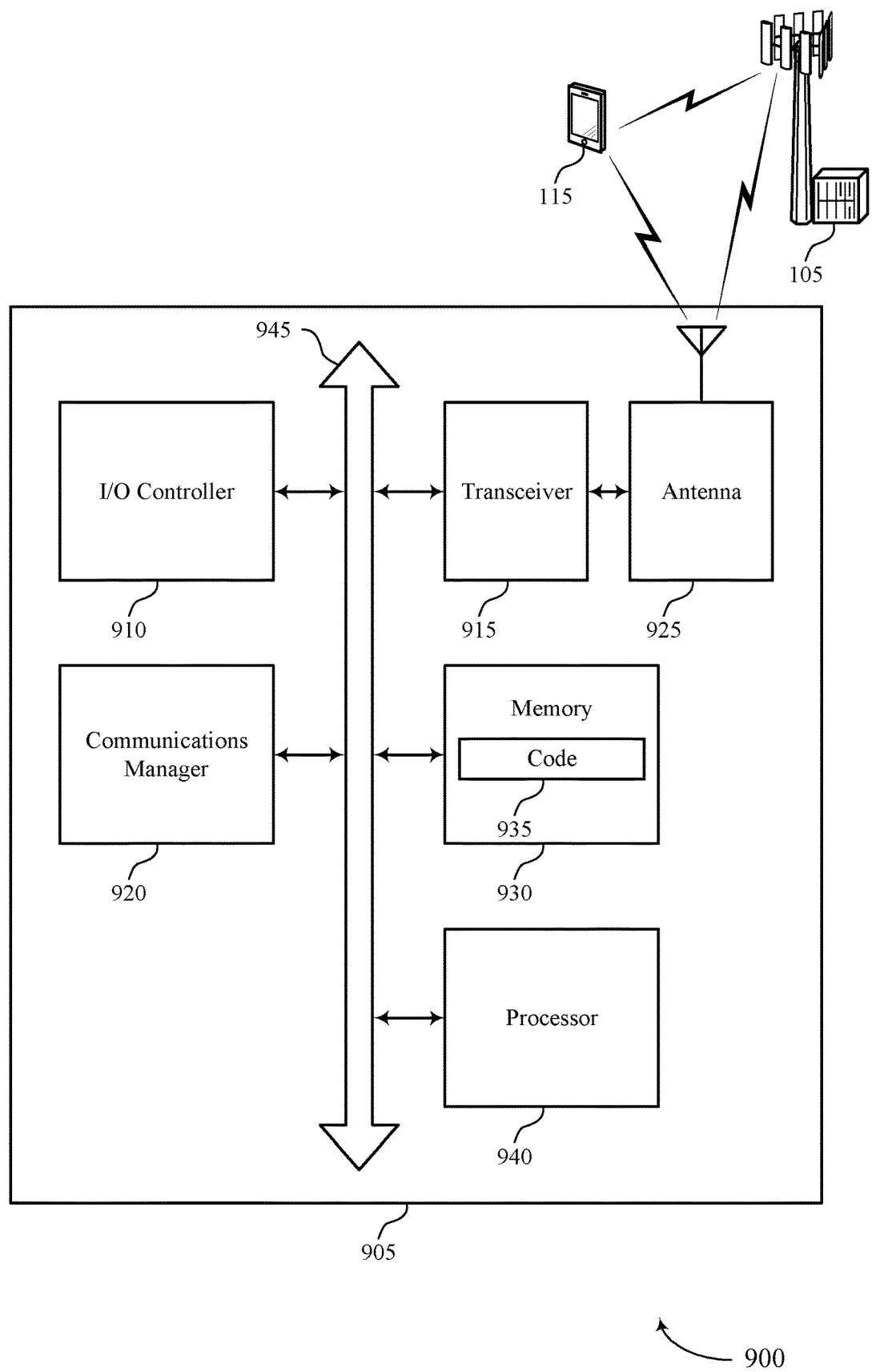
FIG. 9 illustrates a diagram of a system including a device that supports beam management feedback compression in accordance with one or more aspects of the present disclosure.

FIG. 9 illustrates a diagram of a system 900 including a device 905 that supports beam management feedback compression in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting beam management feedback compression). For example, the device 905 or a component of the device 905 may include a processor 940 and memory 930 coupled with or to the processor 940, the processor 940 and memory 930 configured to perform various functions described herein.

The communications manager 920 may support wireless communication at a first wireless device in accordance with examples as disclosed herein. For example, the communications manager 920 may be configured as or otherwise support a means for receiving, from a second wireless device and over a set of multiple different beams, a set of reference signals as part of a beam management procedure. The communications manager 920 may be configured as or otherwise support a means for selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The communications manager 920 may be configured as or otherwise support a means for transmitting, to the second wireless device and using the one or more bit values, control signaling indicating a ranking of the one or more individual beams for the communications between the first wireless device and the second wireless device.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability, among other examples.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of beam management feedback compression as described herein, or the processor 940 and the memory 930 may be otherwise configured to perform or support such operations.

Figure 10:
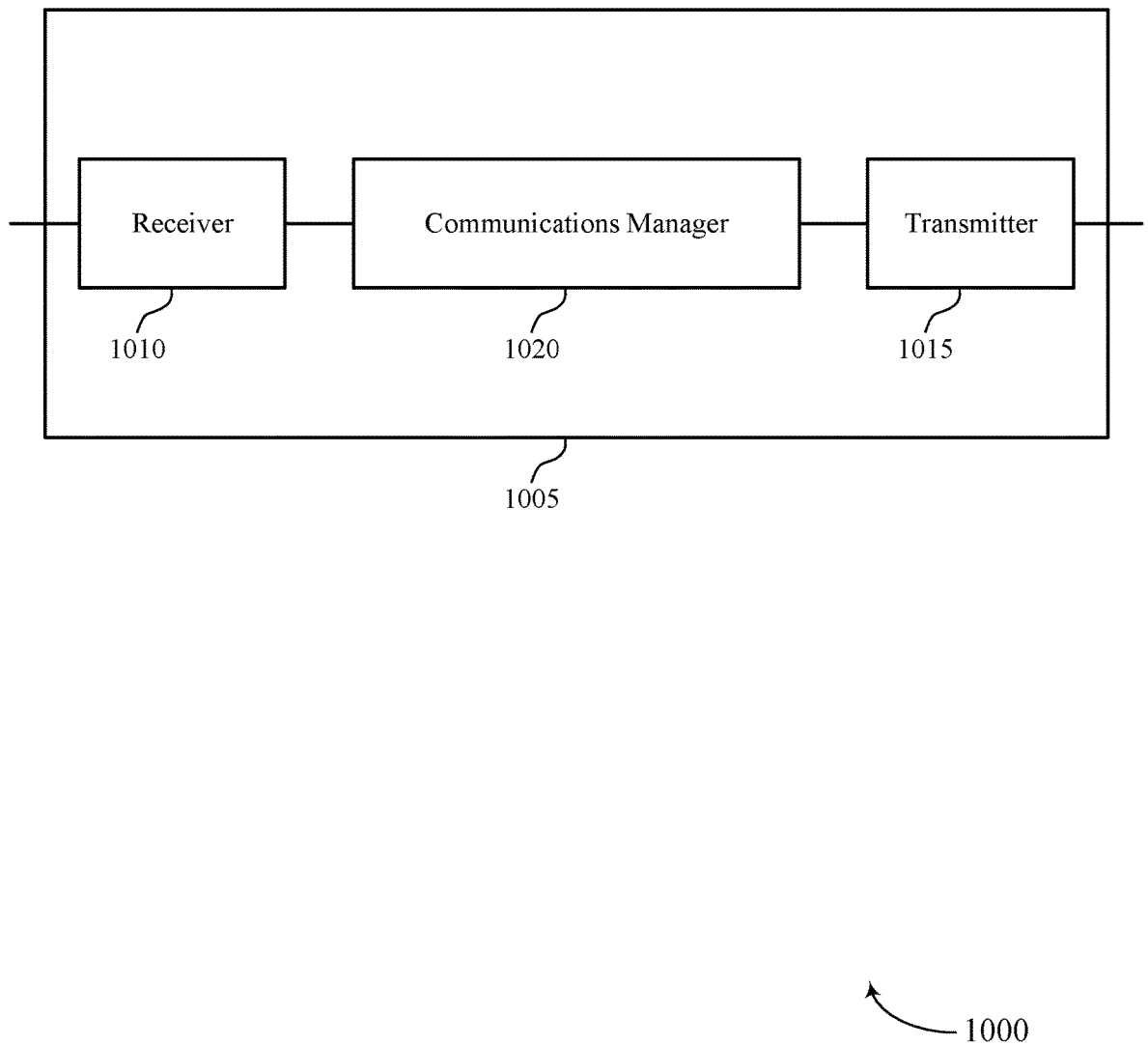
FIGS. 10 and 11 illustrate diagrams of devices that support beam management feedback compression in accordance with one or more aspects of the present disclosure.

FIG. 10 illustrates a diagram 1000 of a device 1005 that supports beam management feedback compression in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of beam management feedback compression as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a second wireless device in accordance with examples as disclosed herein. For example, the communications manager 1020 may be configured as or otherwise support a means for determining, in connection with a beam management procedure, a distribution of probabilities for switching between different beams used for communicating between a first wireless device and the second wireless device. The communications manager 1020 may be configured as or otherwise support a means for transmitting, to the first wireless device and over the different beams, a set of reference signals as part of the beam management procedure. The communications manager 1020 may be configured as or otherwise support a means for receiving, from the first wireless device, control signaling including one or more bit values indicating a ranking of one or more individual beams for communications between the first wireless device and the second wireless device, the one or more bit values based on the distribution of probabilities.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources, among other examples.

Figure 11:
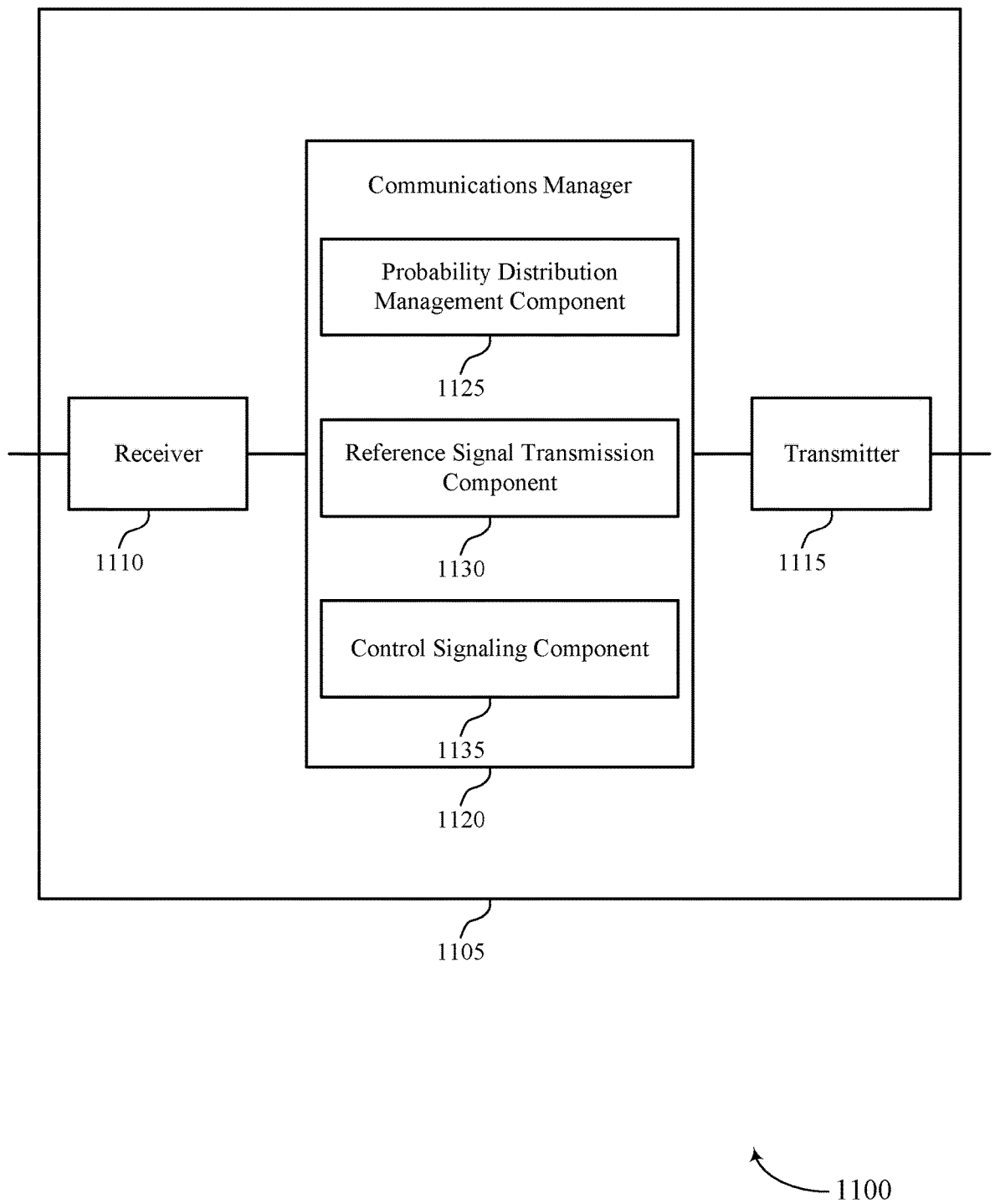

FIG. 11 illustrates a diagram 1100 of a device 1105 that supports beam management feedback compression in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of beam management feedback compression as described herein. For example, the communications manager 1120 may include a probability distribution management component 1125, a reference signal transmission component 1130, a control signaling component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a second wireless device in accordance with examples as disclosed herein. The probability distribution management component 1125 may be configured as or otherwise support a means for determining, in connection with a beam management procedure, a distribution of probabilities for switching between different beams used for communicating between a first wireless device and the second wireless device. The reference signal transmission component 1130 may be configured as or otherwise support a means for transmitting, to the first wireless device and over the different beams, a set of reference signals as part of the beam management procedure. The control signaling component 1135 may be configured as or otherwise support a means for receiving, from the first wireless device, control signaling including one or more bit values indicating a ranking of one or more individual beams for communications between the first wireless device and the second wireless device, the one or more bit values based on the distribution of probabilities.

Figure 12:
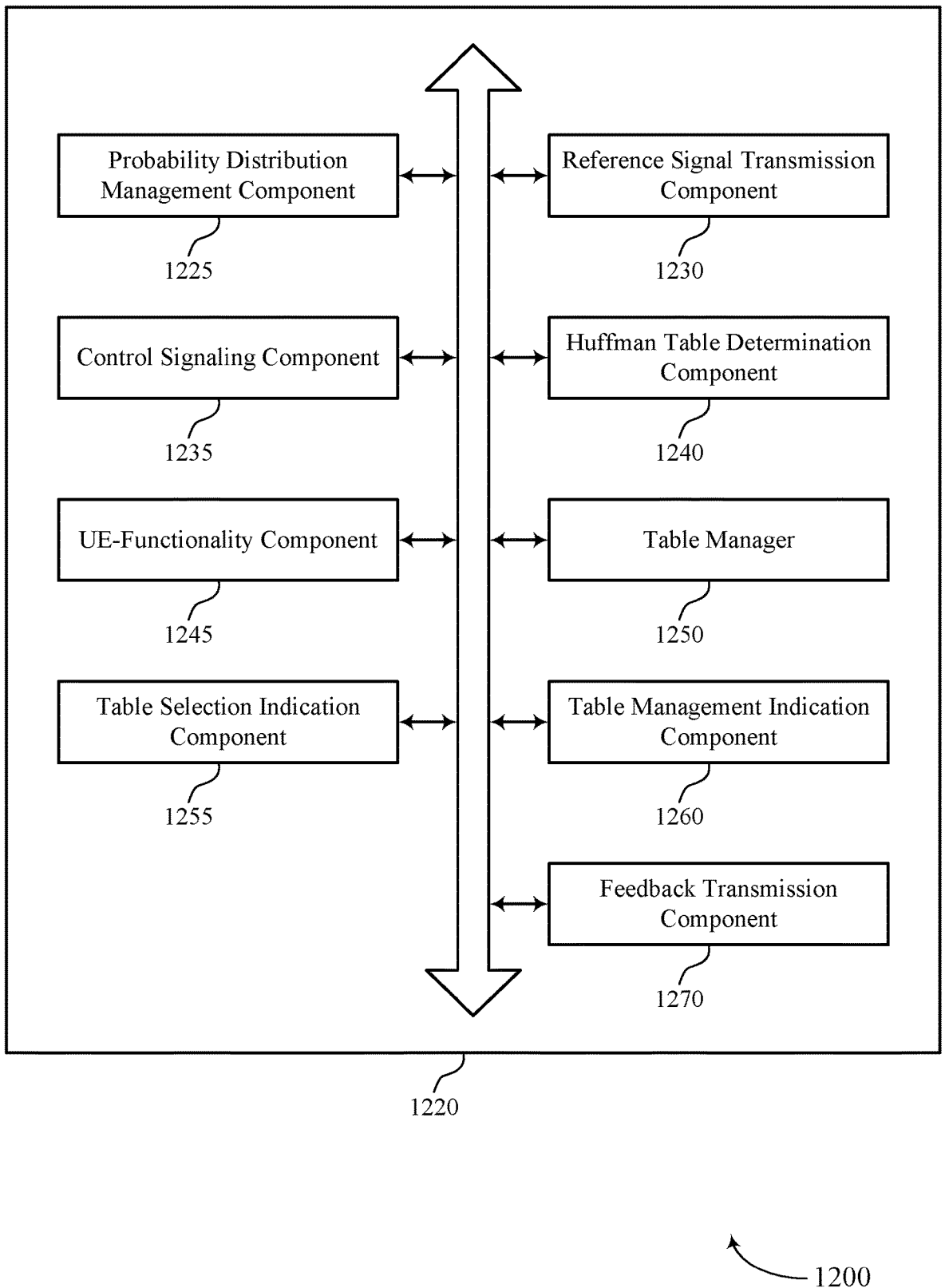
FIG. 12 illustrates a diagram of a communications manager that supports beam management feedback compression in accordance with one or more aspects of the present disclosure.

FIG. 12 illustrates a diagram 1200 of a communications manager 1220 that supports beam management feedback compression in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of beam management feedback compression as described herein. For example, the communications manager 1220 may include a probability distribution management component 1225, a reference signal transmission component 1230, a control signaling component 1235, a Huffman table determination component 1240, a UE-functionality component 1245, a table manager 1250, a table selection indication component 1255, a table management indication component 1260, a feedback transmission component 1270, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a second wireless device in accordance with examples as disclosed herein. The probability distribution management component 1225 may be configured as or otherwise support a means for determining, in connection with a beam management procedure, a distribution of probabilities for switching between different beams used for communicating between a first wireless device and the second wireless device. The reference signal transmission component 1230 may be configured as or otherwise support a means for transmitting, to the first wireless device and over the different beams, a set of reference signals as part of the beam management procedure. The control signaling component 1235 may be configured as or otherwise support a means for receiving, from the first wireless device, control signaling including one or more bit values indicating a ranking of one or more individual beams for communications between the first wireless device and the second wireless device, the one or more bit values based on the distribution of probabilities.

In some examples, the Huffman table determination component 1240 may be configured as or otherwise support a means for determining a table based on the distribution of probabilities, individual values of the table indicating a respective probability for switching between an individual beam of the set of multiple different beams and another beam of the set of multiple different beams, where the one or more bit values are based on a Huffman coding of the table.

In some examples, to support determining the table based on the distribution of probabilities, the table manager 1250 may be configured as or otherwise support a means for initiating the table based on a baseline distribution of probabilities. In some examples, to support determining the table based on the distribution of probabilities, the probability distribution management component 1225 may be configured as or otherwise support a means for determining the distribution of probabilities over a quantity of reporting occasions based on a signal quality of each beam of the set of multiple different beams. In some examples, to support determining the table based on the distribution of probabilities, the table manager 1250 may be configured as or otherwise support a means for updating the table based on the distribution of probabilities.

In some examples, the table management indication component 1260 may be configured as or otherwise support a means for transmitting, to the first wireless device, information that is indicative of a set of parameters for determining the distribution of probabilities at the first wireless device.

In some examples, the set of parameters includes a start time for transitioning to beam report generation based on the distribution of probabilities, a quantity of time occasions to be evaluated in the determining of the distribution of probabilities, or both.

In some examples, the feedback transmission component 1270 may be configured as or otherwise support a means for transmitting a positive acknowledgment via a physical uplink control channel to the first wireless device, where determining the distribution of probabilities is based on transmitting the positive acknowledgment.

In some examples, to support determining the table based on the distribution of probabilities, the Huffman table determination component 1240 may be configured as or otherwise support a means for receiving an indication of the table from the first wireless device, the table selected from one or more predetermined tables based on the distribution of probabilities.

In some examples, the table selection indication component 1255 may be configured as or otherwise support a means for transmitting, to the first wireless device, an indication of the table from the first wireless device, the table selected from one or more predetermined tables based on the distribution of probabilities.

In some examples, the indication is transmitted via broadcast signaling, periodic broadcast signaling, layer 2 signaling, or layer 3 signaling, or any combination thereof.

In some examples, to support receiving the control signaling that indicates the ranking of the one or more individual beams, the control signaling component 1235 may be configured as or otherwise support a means for receiving a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

In some examples, the table management indication component 1260 may be configured as or otherwise support a means for transmitting, to the first wireless device, a signal indicative that the table is to be reset to a baseline distribution of probabilities.

In some examples, the table management indication component 1260 may be configured as or otherwise support a means for transmitting, to the first wireless device, a signal indicative that the table is not to be autonomously updated by the first wireless device. In some examples, the table management indication component 1260 may be configured as or otherwise support a means for transmitting, to the first wireless device, one or more updates to the table.

In some examples, the table management indication component 1260 may be configured as or otherwise support a means for transmitting, to the first wireless device, a signal indicative that the table is to be replaced by a second table indicated by the second wireless device.

In some examples, the signal is transmitted as a broadcast signal and. In some examples, the second table pertains to a set of multiple wireless devices that includes the first wireless device.

In some examples, the table management indication component 1260 may be configured as or otherwise support a means for transmitting, to the first wireless device, a signal indicating that the first wireless device is to autonomously update the table based on one or more measurements that trigger an update to the distribution of probabilities or, alternatively, select the table from one or more predetermined tables.

In some examples, the UE-functionality component 1245 may be configured as or otherwise support a means for receiving, from the first wireless device, information indicating whether the first wireless device supports a set of functionalities associated with determining a second distribution of probabilities.

In some examples, the 1265 may be configured as or otherwise support a means for where the set of functionalities includes one or more of determining the second distribution of probabilities, determining the second distribution of probabilities based on average statistics associated with the different beams, or selecting a table indicating the second distribution of probabilities from a set of tables.

In some examples, to support receiving the control signaling indicating the ranking of the one or more individual beams for the communications between the first wireless device and the second wireless device, the control signaling component 1235 may be configured as or otherwise support a means for receiving, as the control signaling, one or both of a CRI or an SSB-RI.

Figure 13:
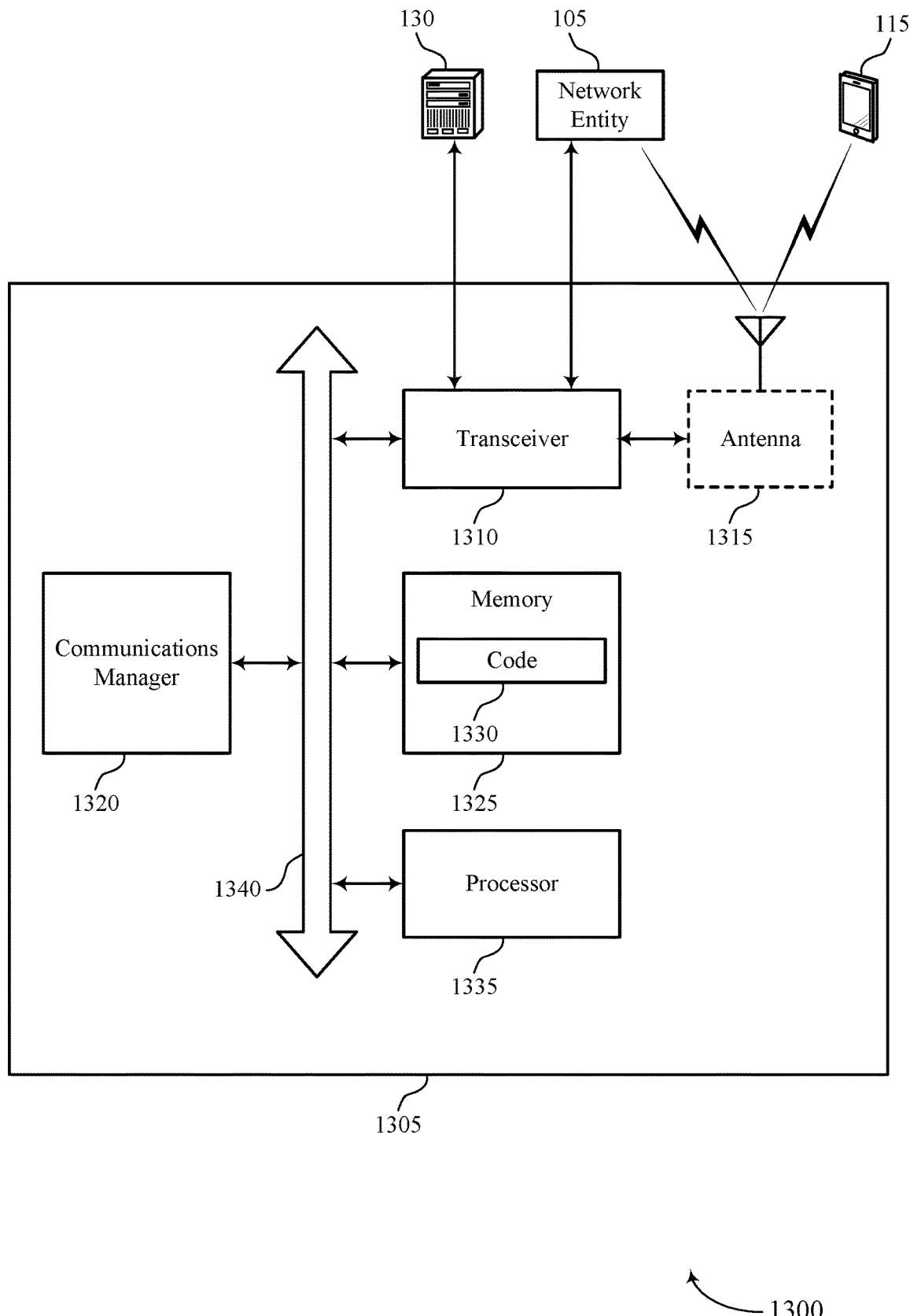
FIG. 13 illustrates a diagram of a system including a device that supports beam management feedback compression in accordance with one or more aspects of the present disclosure.

FIG. 13 illustrates a diagram of a system 1300 including a device 1305 that supports beam management feedback compression in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting beam management feedback compression). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a second wireless device in accordance with examples as disclosed herein. For example, the communications manager 1320 may be configured as or otherwise support a means for determining, in connection with a beam management procedure, a distribution of probabilities for switching between different beams used for communicating between a first wireless device and the second wireless device. The communications manager 1320 may be configured as or otherwise support a means for transmitting, to the first wireless device and over the different beams, a set of reference signals as part of the beam management procedure. The communications manager 1320 may be configured as or otherwise support a means for receiving, from the first wireless device, control signaling including one or more bit values indicating a ranking of one or more individual beams for communications between the first wireless device and the second wireless device, the one or more bit values based on the distribution of probabilities.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, improved utilization of processing capability, among other examples.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of beam management feedback compression as described herein, or the processor 1335 and the memory 1325 may be otherwise configured to perform or support such operations.

Figure 14:
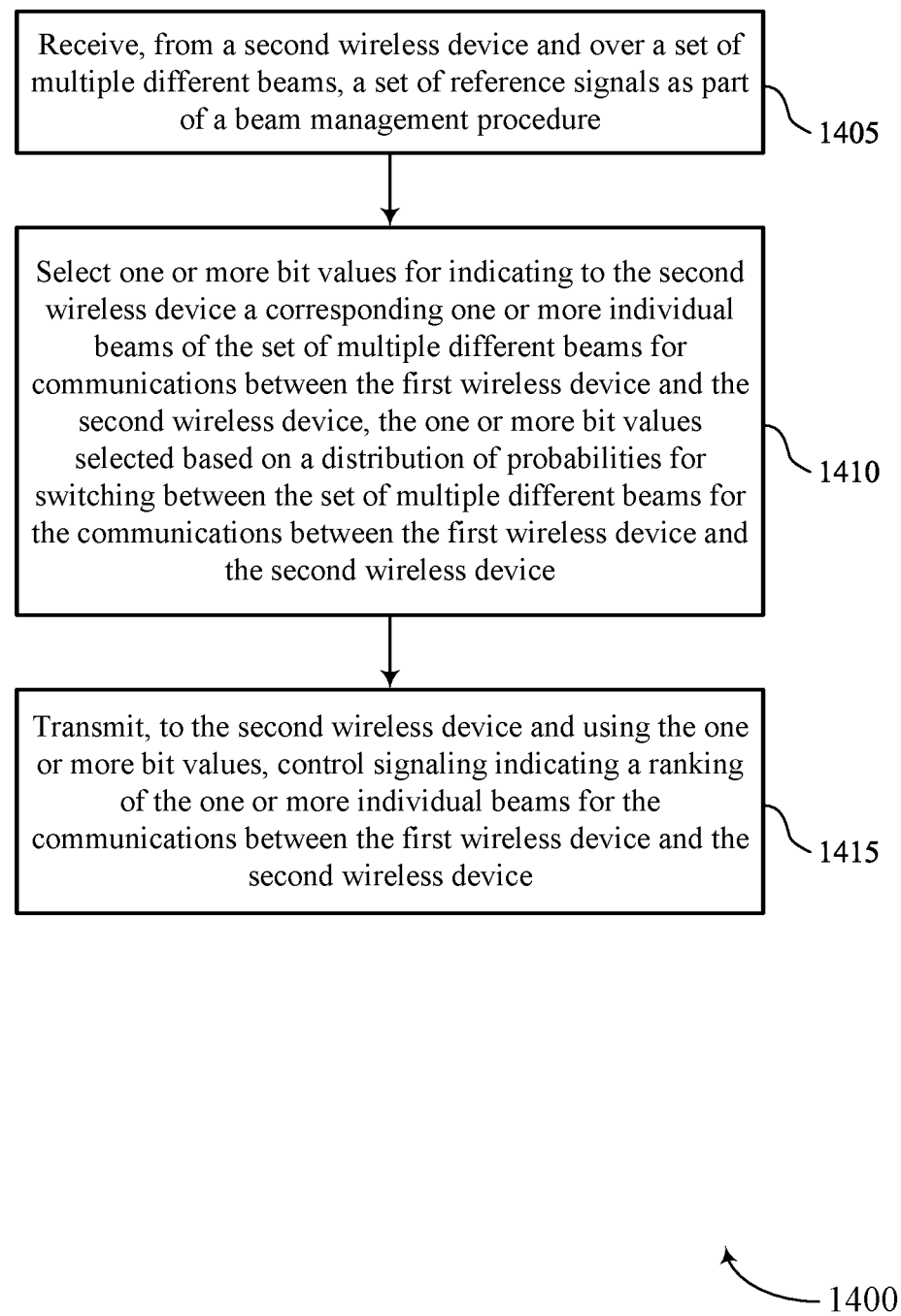
FIGS. 14 through 19 illustrate flowcharts showing methods that support beam management feedback compression in accordance with one or more aspects of the present disclosure.

FIG. 14 illustrates a flowchart showing a method 1400 that supports beam management feedback compression in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a second wireless device and over a set of multiple different beams, a set of reference signals as part of a beam management procedure. The operations of 1405 may be performed in accordance with examples as disclosed herein. In some examples, aspects of the operations of 1405 may be performed by a reference signal component 825 as described with reference to FIG. 8.

At 1410, the method may include selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The operations of 1410 may be performed in accordance with examples as disclosed herein. In some examples, aspects of the operations of 1410 may be performed by an encoding component 830 as described with reference to FIG. 8.

At 1415, the method may include transmitting, to the second wireless device and using the one or more bit values, control signaling indicating a ranking of the one or more individual beams for the communications between the first wireless device and the second wireless device. The operations of 1415 may be performed in accordance with examples as disclosed herein. In some examples, aspects of the operations of 1415 may be performed by a reporting component 835 as described with reference to FIG. 8.

Figure 15:
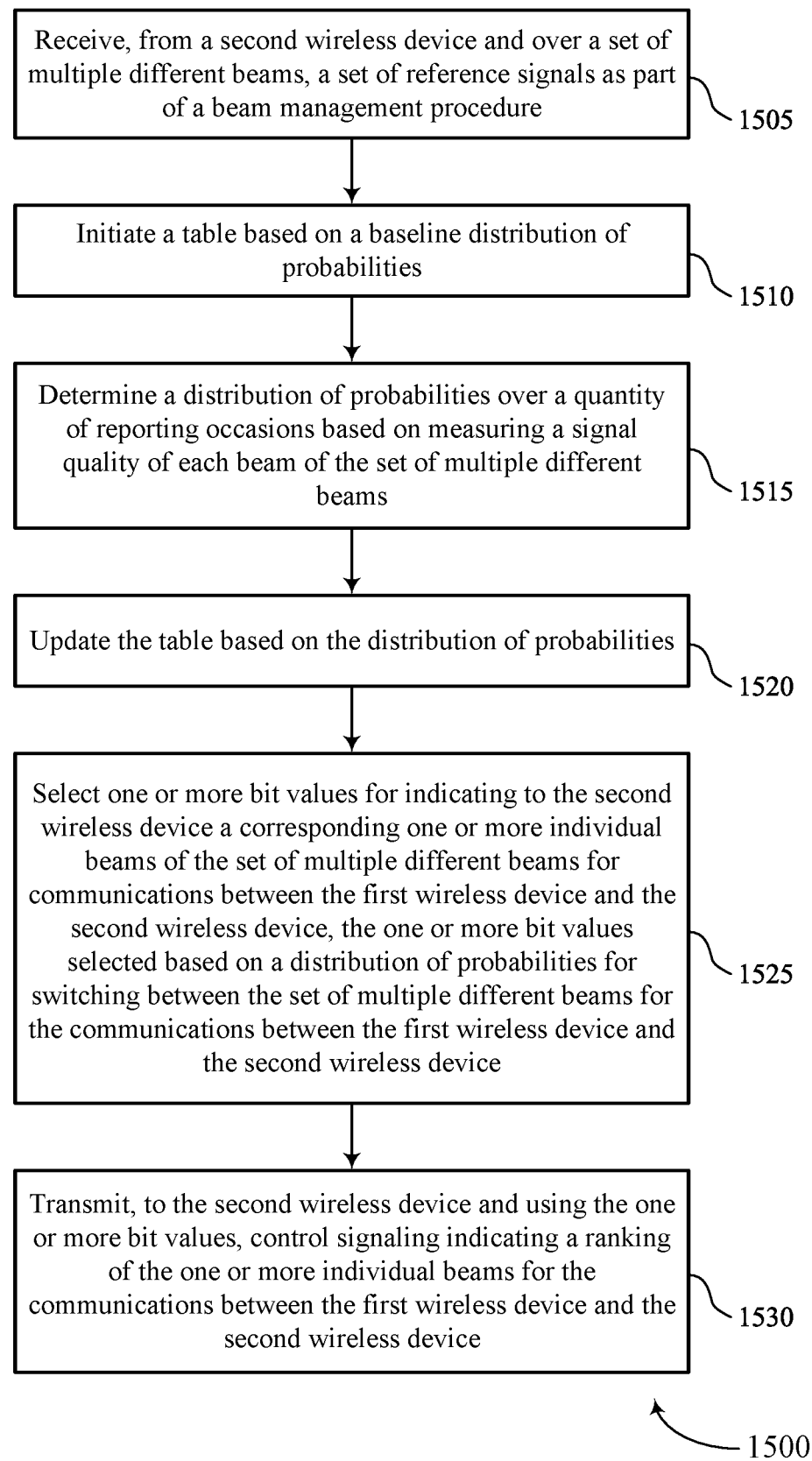

FIG. 15 illustrates a flowchart showing a method 1500 that supports beam management feedback compression in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a second wireless device and over a set of multiple different beams, a set of reference signals as part of a beam management procedure. The operations of 1505 may be performed in accordance with examples as disclosed herein. In some examples, aspects of the operations of 1505 may be performed by a reference signal component 825 as described with reference to FIG. 8.

At 1510, the method may include initiating the table based on a baseline distribution of probabilities. The operations of 1510 may be performed in accordance with examples as disclosed herein. In some examples, aspects of the operations of 1510 may be performed by a table management component 850 as described with reference to FIG. 8.

At 1515, the method may include determining the distribution of probabilities over a quantity of reporting occasions based on measuring a signal quality of each beam of the set of multiple different beams. The operations of 1515 may be performed in accordance with examples as disclosed herein. In some examples, aspects of the operations of 1515 may be performed by a distribution component 855 as described with reference to FIG. 8.

At 1520, the method may include updating the table based on the distribution of probabilities. The operations of 1520 may be performed in accordance with examples as disclosed herein. In some examples, aspects of the operations of 1520 may be performed by a table management component 850 as described with reference to FIG. 8.

At 1525, the method may include selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The operations of 1525 may be performed in accordance with examples as disclosed herein. In some examples, aspects of the operations of 1525 may be performed by an encoding component 830 as described with reference to FIG. 8.

At 1530, the method may include transmitting, to the second wireless device and using the one or more bit values, control signaling indicating a ranking of the one or more individual beams for the communications between the first wireless device and the second wireless device. The operations of 1530 may be performed in accordance with examples as disclosed herein. In some examples, aspects of the operations of 1530 may be performed by a reporting component 835 as described with reference to FIG. 8.

Figure 16:
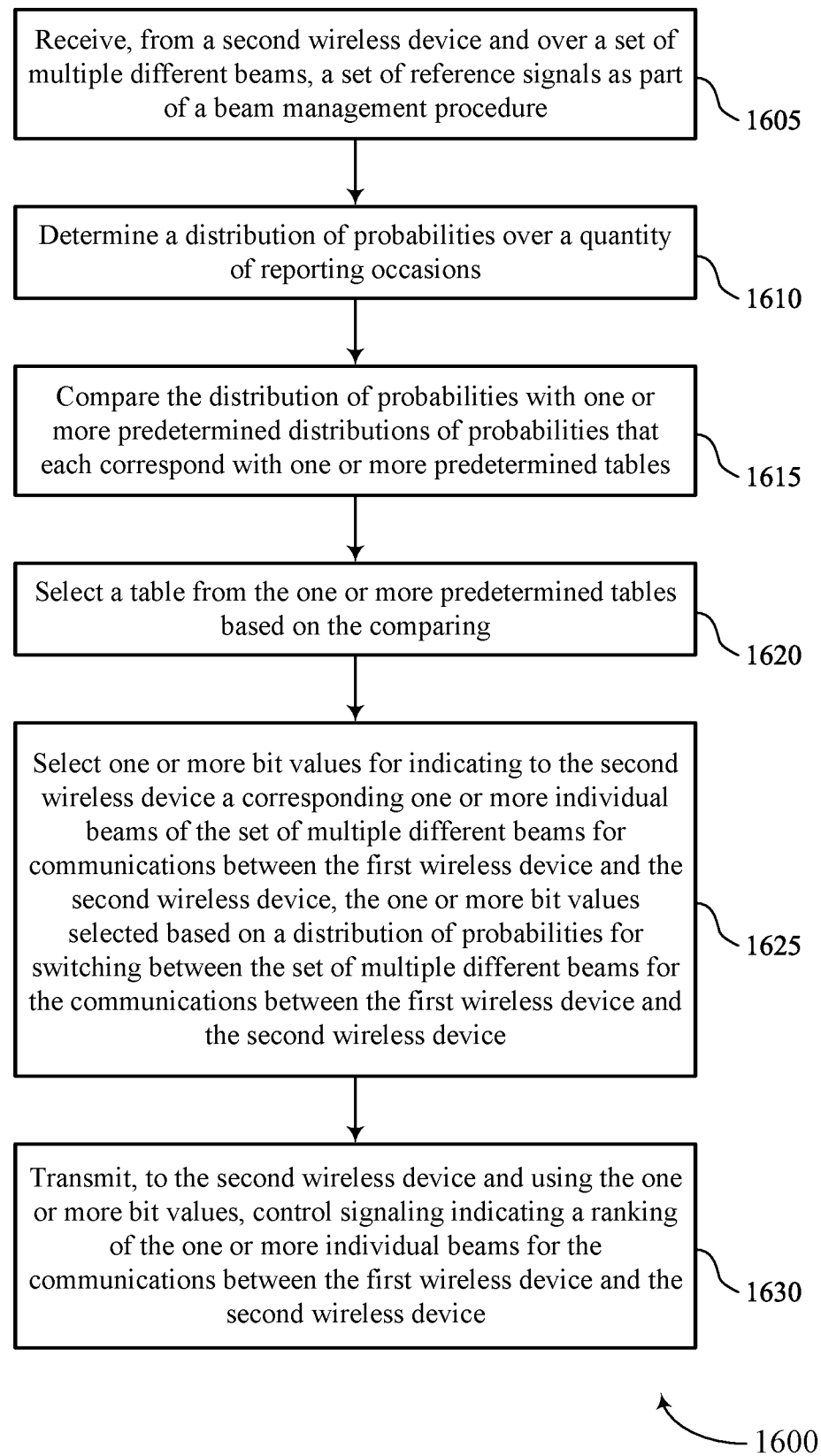

FIG. 16 illustrates a flowchart showing a method 1600 that supports beam management feedback compression in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a second wireless device and over a set of multiple different beams, a set of reference signals as part of a beam management procedure. The operations of 1605 may be performed in accordance with examples as disclosed herein. In some examples, aspects of the operations of 1605 may be performed by a reference signal component 825 as described with reference to FIG. 8.

At 1610, the method may include determining the distribution of probabilities over a quantity of reporting occasions. The operations of 1610 may be performed in accordance with examples as disclosed herein. In some examples, aspects of the operations of 1610 may be performed by a distribution component 855 as described with reference to FIG. 8.

At 1615, the method may include comparing the distribution of probabilities with one or more predetermined distributions of probabilities that each correspond with one or more predetermined tables. The operations of 1615 may be performed in accordance with examples as disclosed herein. In some examples, aspects of the operations of 1615 may be performed by a table selection component 860 as described with reference to FIG. 8.

At 1620, the method may include selecting the table from the one or more predetermined tables based on the comparing. The operations of 1620 may be performed in accordance with examples as disclosed herein. In some examples, aspects of the operations of 1620 may be performed by a table selection component 860 as described with reference to FIG. 8.

At 1625, the method may include selecting one or more bit values for indicating to the second wireless device a corresponding one or more individual beams of the set of multiple different beams for communications between the first wireless device and the second wireless device, the one or more bit values selected based on a distribution of probabilities for switching between the set of multiple different beams for the communications between the first wireless device and the second wireless device. The operations of 1625 may be performed in accordance with examples as disclosed herein. In some examples, aspects of the operations of 1625 may be performed by an encoding component 830 as described with reference to FIG. 8.

At 1630, the method may include transmitting, to the second wireless device and using the one or more bit values, control signaling indicating a ranking of the one or more individual beams for the communications between the first wireless device and the second wireless device. The operations of 1630 may be performed in accordance with examples as disclosed herein. In some examples, aspects of the operations of 1630 may be performed by a reporting component 835 as described with reference to FIG. 8.

Figure 17:
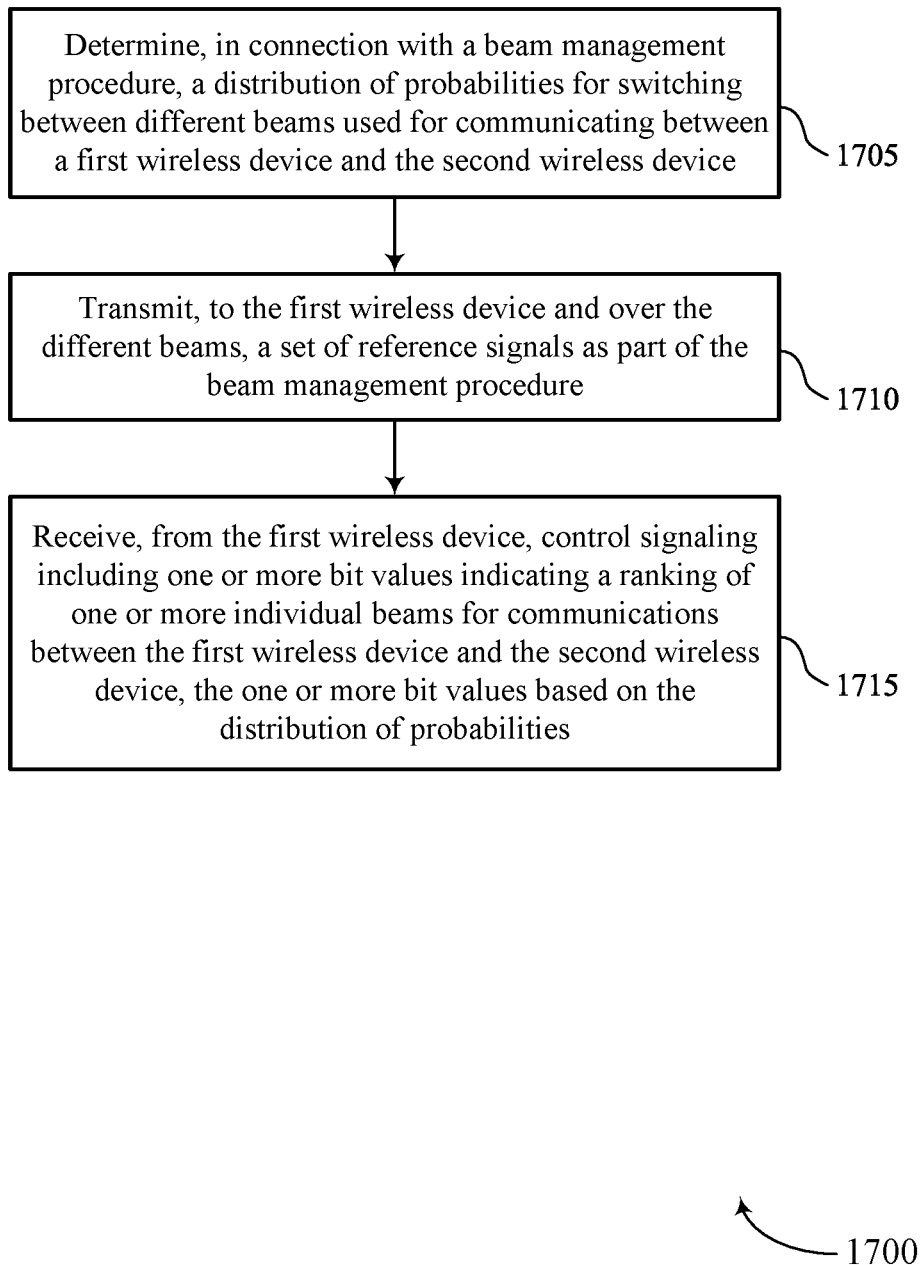

FIG. 17 illustrates a flowchart showing a method 1700 that supports beam management feedback compression in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include determining, in connection with a beam management procedure, a distribution of probabilities for switching between different beams used for communicating between a first wireless device and the second wireless device. The operations of 1705 may be performed in accordance with examples as disclosed herein. In some examples, aspects of the operations of 1705 may be performed by a probability distribution management component 1225 as described with reference to FIG. 12.

At 1710, the method may include transmitting, to the first wireless device and over the different beams, a set of reference signals as part of the beam management procedure. The operations of 1710 may be performed in accordance with examples as disclosed herein. In some examples, aspects of the operations of 1710 may be performed by a reference signal transmission component 1230 as described with reference to FIG. 12.

At 1715, the method may include receiving, from the first wireless device, control signaling including one or more bit values indicating a ranking of one or more individual beams for communications between the first wireless device and the second wireless device, the one or more bit values based on the distribution of probabilities. The operations of 1715 may be performed in accordance with examples as disclosed herein. In some examples, aspects of the operations of 1715 may be performed by a control signaling component 1235 as described with reference to FIG. 12.

Figure 18:
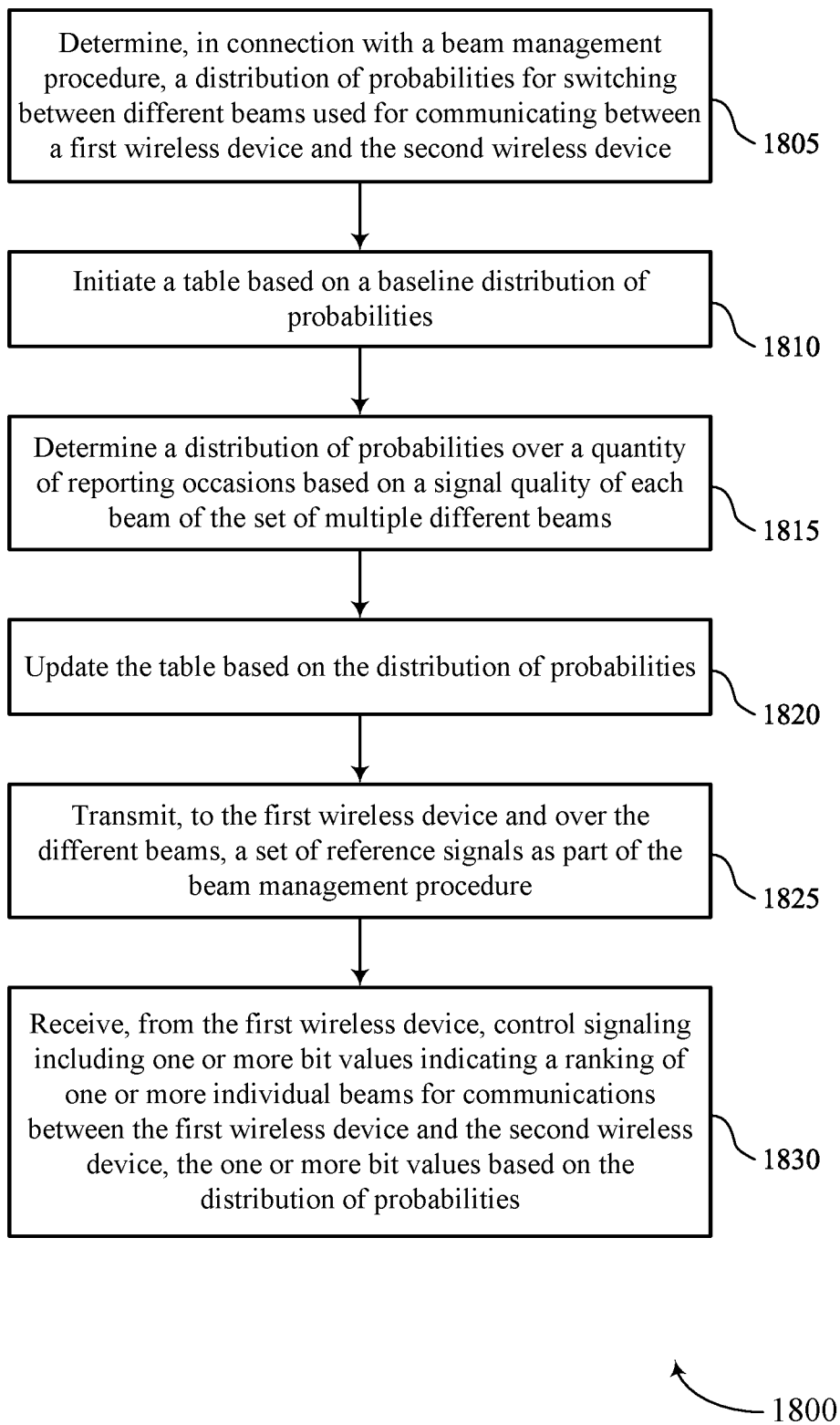

FIG. 18 illustrates a flowchart showing a method 1800 that supports beam management feedback compression in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include determining, in connection with a beam management procedure, a distribution of probabilities for switching between different beams used for communicating between a first wireless device and the second wireless device. The operations of 1805 may be performed in accordance with examples as disclosed herein. In some examples, aspects of the operations of 1805 may be performed by a probability distribution management component 1225 as described with reference to FIG. 12.

At 1810, the method may include initiating the table based on a baseline distribution of probabilities. The operations of 1810 may be performed in accordance with examples as disclosed herein. In some examples, aspects of the operations of 1810 may be performed by a table manager 1250 as described with reference to FIG. 12.

At 1815, the method may include determining the distribution of probabilities over a quantity of reporting occasions based on a signal quality of each beam of the set of multiple different beams. The operations of 1815 may be performed in accordance with examples as disclosed herein. In some examples, aspects of the operations of 1815 may be performed by a probability distribution management component 1225 as described with reference to FIG. 12.

At 1820, the method may include updating the table based on the distribution of probabilities. The operations of 1820 may be performed in accordance with examples as disclosed herein. In some examples, aspects of the operations of 1820 may be performed by a table manager 1250 as described with reference to FIG. 12.

At 1825, the method may include transmitting, to the first wireless device and over the different beams, a set of reference signals as part of the beam management procedure. The operations of 1825 may be performed in accordance with examples as disclosed herein. In some examples, aspects of the operations of 1825 may be performed by a reference signal transmission component 1230 as described with reference to FIG. 12.

At 1830, the method may include receiving, from the first wireless device, control signaling including one or more bit values indicating a ranking of one or more individual beams for communications between the first wireless device and the second wireless device, the one or more bit values based on the distribution of probabilities. The operations of 1830 may be performed in accordance with examples as disclosed herein. In some examples, aspects of the operations of 1830 may be performed by a control signaling component 1235 as described with reference to FIG. 12.

Figure 19:
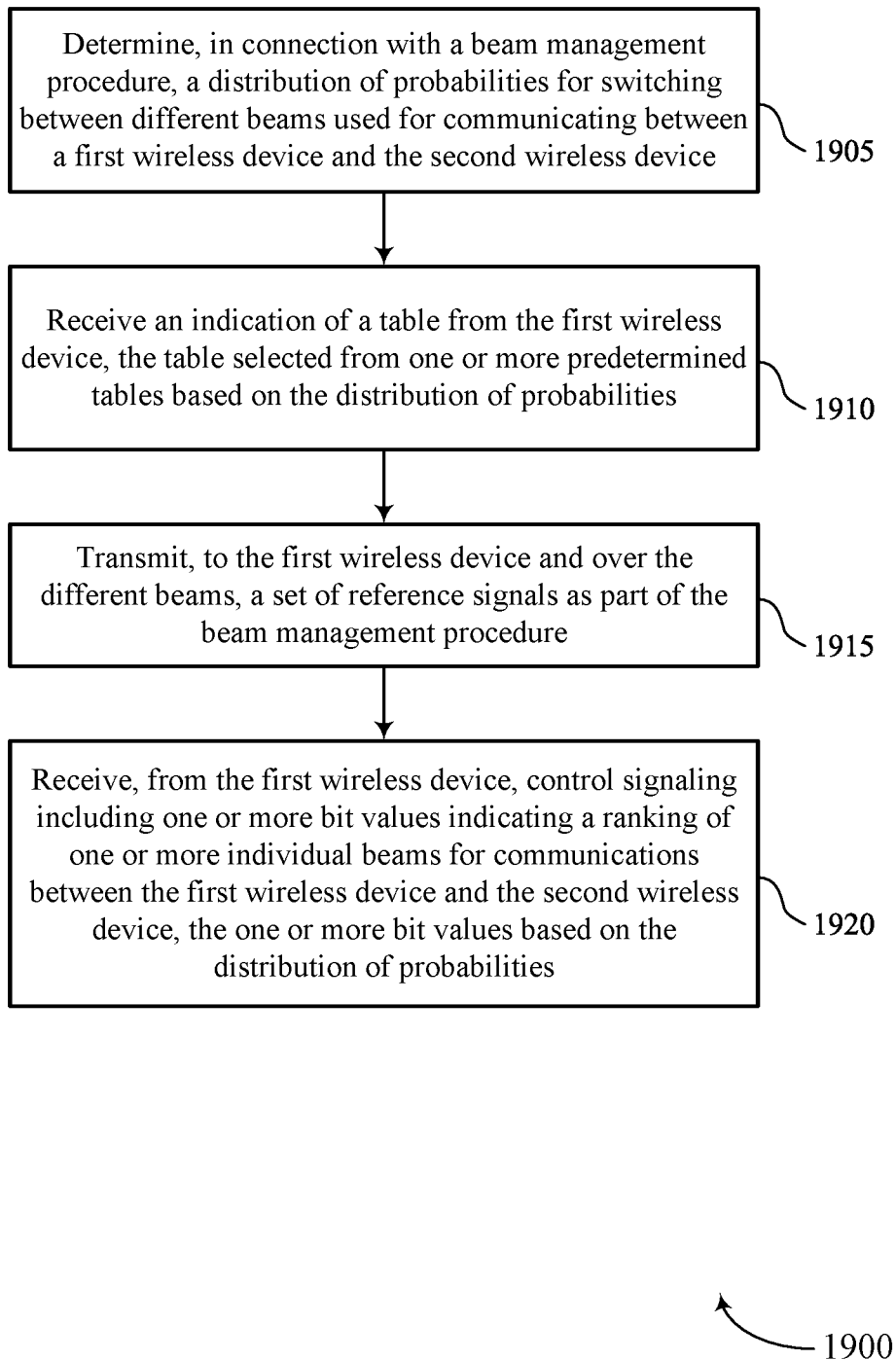

FIG. 19 illustrates a flowchart showing a method 1900 that supports beam management feedback compression in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include determining, in connection with a beam management procedure, a distribution of probabilities for switching between different beams used for communicating between a first wireless device and the second wireless device. The operations of 1905 may be performed in accordance with examples as disclosed herein. In some examples, aspects of the operations of 1905 may be performed by a probability distribution management component 1225 as described with reference to FIG. 12.

At 1910, the method may include receiving an indication of the table from the first wireless device, the table selected from one or more predetermined tables based on the distribution of probabilities. The operations of 1910 may be performed in accordance with examples as disclosed herein. In some examples, aspects of the operations of 1910 may be performed by a Huffman table determination component 1240 as described with reference to FIG. 12.

At 1915, the method may include transmitting, to the first wireless device and over the different beams, a set of reference signals as part of the beam management procedure. The operations of 1915 may be performed in accordance with examples as disclosed herein. In some examples, aspects of the operations of 1915 may be performed by a reference signal transmission component 1230 as described with reference to FIG. 12.

At 1920, the method may include receiving, from the first wireless device, control signaling including one or more bit values indicating a ranking of one or more individual beams for communications between the first wireless device and the second wireless device, the one or more bit values based on the distribution of probabilities. The operations of 1920 may be performed in accordance with examples as disclosed herein. In some examples, aspects of the operations of 1920 may be performed by a control signaling component 1235 as described with reference to FIG. 12.

The following provides an overview of aspects of the present disclosure:

Aspect 1: A method for wireless communication at a first wireless device, comprising: receiving, from a second wireless device and over a plurality of different beams, a set of reference signals as part of a beam management procedure; selecting one or more bit values for indicating to the second wireless device a corresponding one or more individual beams of the plurality of different beams for communications between the first wireless device and the second wireless device, the one or more bit values selected based on a distribution of probabilities for switching between the plurality of different beams for the communications between the first wireless device and the second wireless device; and transmitting, to the second wireless device and using the one or more bit values, control signaling indicating a ranking of the one or more individual beams for the communications between the first wireless device and the second wireless device.

Aspect 2: The method of aspect 1, further comprising: determining a table based on the distribution of probabilities, individual values of the table indicating a respective probability for switching between an individual beam of the plurality of different beams and another beam of the plurality of different beams, wherein the one or more bit values are based on a Huffman coding of the table.

Aspect 3: The method of aspect 2, wherein determining the table based on the distribution of probabilities comprises: initiating the table based on a baseline distribution of probabilities; determining the distribution of probabilities over a quantity of reporting occasions based at least in part on measuring a signal quality of each beam of the plurality of different beams; and updating the table based on the distribution of probabilities.

Aspect 4: The method of aspect 3, further comprising: receiving, from the second wireless device, information that is indicative of a set of parameters for determining the distribution of probabilities.

Aspect 5: The method of aspect 4, wherein the set of parameters comprises a start time for transitioning to beam report generation based on the distribution of probabilities, a quantity of time occasions to be evaluated in the determining of the distribution of probabilities, or both.

Aspect 6: The method of any of aspects 3 through 5, further comprising: receiving a positive acknowledgment via a physical uplink control channel from the second wireless device, wherein determining the distribution of probabilities is based at least in part on receipt of the positive acknowledgment.

Aspect 7: The method of any of aspects 2 through 6, wherein determining the table based on the distribution of probabilities comprises: determining the distribution of probabilities over a quantity of reporting occasions; comparing the distribution of probabilities with one or more predetermined distributions of probabilities that each correspond with one or more predetermined tables; and selecting the table from the one or more predetermined tables based on the comparing.

Aspect 8: The method of aspect 7, further comprising: transmitting an indication of the table to the second wireless device.

Aspect 9: The method of any of aspects 7 through 8, further comprising: receiving an indication of the one or more predetermined tables.

Aspect 10: The method of aspect 9, wherein the indication is received via broadcast signaling, periodic broadcast signaling, layer 2 signaling, or layer 3 signaling, or any combination thereof.

Aspect 11: The method of any of aspects 2 through 10, wherein transmitting the control signaling that indicates the ranking of the one or more individual beams comprises: transmitting a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

Aspect 12: The method of any of aspects 2 through 11, further comprising: receiving, from the second wireless device, a signal indicative that the table from which the one or more bit values are selected is to be reset to a baseline distribution of probabilities.

Aspect 13: The method of any of aspects 2 through 12, further comprising: receiving, from the second wireless device, a signal indicative that the table from which the one or more bit values are selected is not to be autonomously updated by the first wireless device; and receiving, from the second wireless device, one or more updates to the table.

Aspect 14: The method of any of aspects 2 through 13, further comprising: receiving, from the second wireless device, a signal indicative that the table from which the one or more bit values are selected is to be replaced by a second table indicated by the second wireless device.

Aspect 15: The method of aspect 14, wherein the signal is received as a broadcast signal and the second table pertains to a plurality of wireless devices that includes the first wireless device.

Aspect 16: The method of any of aspects 2 through 15, further comprising: receiving, from the second wireless device, a signal indicating that the first wireless device is to autonomously update the table based on one or more measurements that trigger an update to the distribution of probabilities or, alternatively, select the table from one or more predetermined tables.

Aspect 17: The method of any of aspects 1 through 16, further comprising: transmitting, to the second wireless device, information indicating whether the first wireless device supports a set of functionalities associated with the distribution of probabilities.

Aspect 18: The method of aspect 17, further comprising: wherein the set of functionalities comprises one or more of determining the distribution of probabilities, determining the distribution of probabilities based on average statistics associated with the plurality of different beams, or selecting a table indicating the distribution of probabilities from a set of tables.

Aspect 19: The method of any of aspects 1 through 18, wherein transmitting the control signaling indicating the ranking of the one or more individual beams for the communications between the first wireless device and the second wireless device comprises: transmitting, as the control signaling, one or both of a channel status information reference signal (CSI-RS) resource indicator (CRI) or a synchronization signal block (SSB) resource indicator (SSB-RI).

Aspect 20: A method for wireless communication at a second wireless device, comprising: determining, in connection with a beam management procedure, a distribution of probabilities for switching between different beams used for communicating between a first wireless device and the second wireless device; transmitting, to the first wireless device and over the different beams, a set of reference signals as part of the beam management procedure; and receiving, from the first wireless device, control signaling comprising one or more bit values indicating a ranking of one or more individual beams for communications between the first wireless device and the second wireless device, the one or more bit values based at least in part on the distribution of probabilities.

Aspect 21: The method of aspect 20, further comprising: determining a table based on the distribution of probabilities, individual values of the table indicating a respective probability for switching between an individual beam of the plurality of different beams and another beam of the plurality of different beams, wherein the one or more bit values are based on a Huffman coding of the table.

Aspect 22: The method of aspect 21, wherein determining the table based on the distribution of probabilities comprises: initiating the table based on a baseline distribution of probabilities; determining the distribution of probabilities over a quantity of reporting occasions based at least in part on a signal quality of each beam of the plurality of different beams; and updating the table based on the distribution of probabilities.

Aspect 23: The method of aspect 22, further comprising: transmitting, to the first wireless device, information that is indicative of a set of parameters for determining the distribution of probabilities at the first wireless device.

Aspect 24: The method of aspect 23, wherein the set of parameters comprises a start time for transitioning to beam report generation based on the distribution of probabilities, a quantity of time occasions to be evaluated in the determining of the distribution of probabilities, or both.

Aspect 25: The method of any of aspects 22 through 24, further comprising: transmitting a positive acknowledgment via a physical uplink control channel to the first wireless device, wherein determining the distribution of probabilities is based at least in part on transmitting the positive acknowledgment.

Aspect 26: The method of any of aspects 21 through 25, wherein determining the table based on the distribution of probabilities comprises: receiving an indication of the table from the first wireless device, the table selected from one or more predetermined tables based at least in part on the distribution of probabilities.

Aspect 27: The method of any of aspects 21 through 26, further comprising: transmitting, to the first wireless device, an indication of the table from the first wireless device, the table selected from one or more predetermined tables based at least in part on the distribution of probabilities.

Aspect 28: The method of aspect 27, wherein the indication is transmitted via broadcast signaling, periodic broadcast signaling, layer 2 signaling, or layer 3 signaling, or any combination thereof.

Aspect 29: The method of any of aspects 21 through 28, wherein receiving the control signaling that indicates the ranking of the one or more individual beams comprises: receiving a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

Aspect 30: The method of any of aspects 21 through 29, further comprising: transmitting, to the first wireless device, a signal indicative that the table is to be reset to a baseline distribution of probabilities.

Aspect 31: The method of any of aspects 21 through 30, further comprising: transmitting, to the first wireless device, a signal indicative that the table is not to be autonomously updated by the first wireless device; and transmitting, to the first wireless device, one or more updates to the table.

Aspect 32: The method of any of aspects 21 through 31, further comprising: transmitting, to the first wireless device, a signal indicative that the table is to be replaced by a second table indicated by the second wireless device.

Aspect 33: The method of aspect 32, wherein the signal is transmitted as a broadcast signal and the second table pertains to a plurality of wireless devices that includes the first wireless device.

Aspect 34: The method of any of aspects 21 through 33, further comprising: transmitting, to the first wireless device, a signal indicating that the first wireless device is to autonomously update the table based on one or more measurements that trigger an update to the distribution of probabilities or, alternatively, select the table from one or more predetermined tables.

Aspect 35: The method of any of aspects 20 through 34, further comprising: receiving, from the first wireless device, information indicating whether the first wireless device supports a set of functionalities associated with determining a second distribution of probabilities.

Aspect 36: The method of aspect 35, further comprising: wherein the set of functionalities comprises one or more of determining the second distribution of probabilities, determining the second distribution of probabilities based on average statistics associated with the different beams, or selecting a table indicating the second distribution of probabilities from a set of tables.

Aspect 37: The method of any of aspects 20 through 36, wherein receiving the control signaling indicating the ranking of the one or more individual beams for the communications between the first wireless device and the second wireless device comprises: receiving, as the control signaling, at least one of a channel status information reference signal (CSI-RS) resource indicator (CRI) or a synchronization signal block (SSB) resource indicator (SSB-RI).

Aspect 38: An apparatus for wireless communication at a first wireless device, comprising a processor; memory coupled with the processor; and instructions stored in the memory and executable by the processor to cause the apparatus to perform a method of any of aspects 1 through 19.

Aspect 39: An apparatus for wireless communication at a first wireless device, comprising at least one means for performing a method of any of aspects 1 through 19.

Aspect 40: A non-transitory computer-readable medium storing code for wireless communication at a first wireless device, the code comprising instructions executable by a processor to perform a method of any of aspects 1 through 19.

Aspect 41: An apparatus for wireless communication at a second wireless device, comprising a processor; memory coupled with the processor; and instructions stored in the memory and executable by the processor to cause the apparatus to perform a method of any of aspects 20 through 37.

Aspect 42: An apparatus for wireless communication at a second wireless device, comprising at least one means for performing a method of any of aspects 20 through 37.

Aspect 43: A non-transitory computer-readable medium storing code for wireless communication at a second wireless device, the code comprising instructions executable by a processor to perform a method of any of aspects 20 through 37.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

o The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
a processor;
memory in communication with the processor; and
instructions stored in the memory and executable by the processor to cause the apparatus to:
receive, from a second wireless device and over a plurality of different beams, a set of reference signals as part of a beam management procedure;
select one or more bit values that indicate to the second wireless device a corresponding one or more individual beams of the plurality of different beams for communications between the first wireless device and the second wireless device, the one or more bit values selected based on a distribution of probabilities for switches between the plurality of different beams for the communications between the first wireless device and the second wireless device; and
transmit, to the second wireless device and through use of the one or more bit values, control signaling that indicates a ranking of the one or more individual beams for the communications between the first wireless device and the second wireless device.

2. The apparatus of claim 1, wherein the instructions are further executable by the processor to cause the apparatus to:
determine a table based on the distribution of probabilities, individual values of the table that indicates a respective probability for switches between an individual beam of the plurality of different beams and another beam of the plurality of different beams, wherein the one or more bit values are based on a Huffman coding of the table.

3. The apparatus of claim 2, wherein the instructions to determine the table based on the distribution of probabilities are executable by the processor to cause the apparatus to:
initiate the table based on a baseline distribution of probabilities;
determine the distribution of probabilities over a quantity of reporting occasions based at least in part on measurement of a signal quality of each beam of the plurality of different beams; and
update the table based on the distribution of probabilities.

4. The apparatus of claim 3, wherein the instructions are further executable by the processor to cause the apparatus to:
receive, from the second wireless device, information that is indicative of a set of parameters for the determination of the distribution of probabilities.

5. The apparatus of claim 4, wherein the set of parameters comprises a start time for transition to beam report generation based on the distribution of probabilities, a quantity of time occasions to be evaluated in the determination of the distribution of probabilities, or both.

6. The apparatus of claim 3, wherein the instructions are further executable by the processor to cause the apparatus to:
receive a positive acknowledgment via a physical uplink control channel from the second wireless device, wherein determination of the distribution of probabilities is based at least in part on receipt of the positive acknowledgment.

7. The apparatus of claim 2, wherein the instructions to determine the table based on the distribution of probabilities are executable by the processor to cause the apparatus to:
determine the distribution of probabilities over a quantity of reporting occasions;
compare the distribution of probabilities with one or more predetermined distributions of probabilities that each correspond with one or more predetermined tables; and
select the table from the one or more predetermined tables based on the comparison.

8. The apparatus of claim 7, wherein the instructions are further executable by the processor to cause the apparatus to:
transmit an indication of the table to the second wireless device.

9. The apparatus of claim 7, wherein the instructions are further executable by the processor to cause the apparatus to:
receive an indication of the one or more predetermined tables.

10. The apparatus of claim 9, wherein the indication is received via broadcast signaling, periodic broadcast signaling, layer 2 signaling, or layer 3 signaling, or any combination thereof.

11. The apparatus of claim 2, wherein the instructions to transmit the control signaling that indicates the ranking of the one or more individual beams are executable by the processor to cause the apparatus to:
transmit a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

12. The apparatus of claim 2, wherein the instructions are further executable by the processor to cause the apparatus to:
receive, from the second wireless device, a signal indicative that the table from which the one or more bit values are selected is to be reset to a baseline distribution of probabilities.

13. The apparatus of claim 2, wherein the instructions are further executable by the processor to cause the apparatus to:
receive, from the second wireless device, a signal indicative that the table from which the one or more bit values are selected is not to be autonomously updated by the first wireless device; and
receive, from the second wireless device, one or more updates to the table.

14. The apparatus of claim 2, wherein the instructions are further executable by the processor to cause the apparatus to:
receive, from the second wireless device, a signal indicative that the table from which the one or more bit values are selected is to be replaced by a second table indicated by the second wireless device.

15. The apparatus of claim 14, wherein:
the signal is received as a broadcast signal; and
the second table pertains to a plurality of wireless devices that includes the first wireless device.

16. The apparatus of claim 2, wherein the instructions are further executable by the processor to cause the apparatus to:
receive, from the second wireless device, a signal that indicates that the first wireless device is to autonomously update the table based on one or more measurements that trigger an update to the distribution of probabilities or, alternatively, select the table from one or more predetermined tables.

17. The apparatus of claim 1, wherein the instructions are further executable by the processor to cause the apparatus to:
transmit, to the second wireless device, information that indicates whether the first wireless device supports a set of functionalities associated with the distribution of probabilities.

18. The apparatus of claim 17, wherein the instructions are further executable by the processor to cause the apparatus to:
wherein the set of functionalities comprise one or more of determination of the distribution of probabilities, determination of the distribution of probabilities based on average statistics associated with the plurality of different beams, or selection of a table that indicates the distribution of probabilities from a set of tables.

19. The apparatus of claim 1, wherein the instructions to transmit the control signaling that indicates the ranking of the one or more individual beams for the communications between the first wireless device and the second wireless device are executable by the processor to cause the apparatus to:
transmit, as the control signaling, one or both of a channel status information reference signal (CSI-RS) resource indicator (CRI) or a synchronization signal block (SSB) resource indicator (SSB-RI).

20. An apparatus for wireless communication at a second wireless device, comprising:
a processor;
memory in communication with the processor; and
instructions stored in the memory and executable by the processor to cause the apparatus to:
determine, in connection with a beam management procedure, a distribution of probabilities for switches between different beams used for communication between a first wireless device and the second wireless device;
transmit, to the first wireless device and over the different beams, a set of reference signals as part of the beam management procedure; and
receive, from the first wireless device, control signaling that comprises one or more bit values that indicate a ranking of one or more individual beams for communications between the first wireless device and the second wireless device, the one or more bit values based at least in part on the distribution of probabilities.

21. The apparatus of claim 20, wherein the instructions are further executable by the processor to cause the apparatus to:
determine a table based on the distribution of probabilities, individual values of the table that indicates a respective probability for switches between an individual beam of the different beams and another beam of the different beams, wherein the one or more bit values are based on a Huffman coding of the table.

22. The apparatus of claim 21, wherein the instructions to determine the table based on the distribution of probabilities are executable by the processor to cause the apparatus to:
initiate the table based on a baseline distribution of probabilities;
determine the distribution of probabilities over a quantity of reporting occasions based at least in part on a signal quality of each beam of the different beams; and
update the table based on the distribution of probabilities.

23. The apparatus of claim 22, wherein the instructions are further executable by the processor to cause the apparatus to:
transmit, to the first wireless device, information that is indicative of a set of parameters for the determination of the distribution of probabilities at the first wireless device.

24. The apparatus of claim 22, wherein the instructions are further executable by the processor to cause the apparatus to:
transmit a positive acknowledgment via a physical uplink control channel to the first wireless device, wherein the determination of the distribution of probabilities is based at least in part on transmission of the positive acknowledgment.

25. The apparatus of claim 21, wherein the instructions to determine the table based on the distribution of probabilities are executable by the processor to cause the apparatus to:
receive an indication of the table from the first wireless device, the table selected from one or more predetermined tables based at least in part on the distribution of probabilities.

26. The apparatus of claim 21, wherein the instructions are further executable by the processor to cause the apparatus to:
transmit, to the first wireless device, an indication of the table from the first wireless device, the table selected from one or more predetermined tables based at least in part on the distribution of probabilities.

27. The apparatus of claim 21, wherein the instructions to receive the control signaling that indicates the ranking of the one or more individual beams are executable by the processor to cause the apparatus to:
receive a report that includes the one or more bit values as a first bit value and as one or more delta bit values, the first bit value based on the Huffman coding of the table and the one or more delta bit values each representative of a difference between a Huffman-coded entry in the table corresponding to a first beam index and another Huffman-coded entry in the table corresponding to a second beam index included in the report.

28. The apparatus of claim 21, wherein the instructions are further executable by the processor to cause the apparatus to:
transmit, to the first wireless device, a signal indicative that the table is to be reset to a baseline distribution of probabilities.

29. A method for wireless communication at a first wireless device, comprising:
receiving, from a second wireless device and over a plurality of different beams, a set of reference signals as part of a beam management procedure;
selecting one or more bit values for indicating to the second wireless device a corresponding one or more individual beams of the plurality of different beams for communications between the first wireless device and the second wireless device, the one or more bit values selected based on a distribution of probabilities for switching between the plurality of different beams for the communications between the first wireless device and the second wireless device; and
transmitting, to the second wireless device and using the one or more bit values, control signaling indicating a ranking of the one or more individual beams for the communications between the first wireless device and the second wireless device.

30. A method for wireless communication at a second wireless device, comprising:
determining, in connection with a beam management procedure, a distribution of probabilities for switching between different beams used for communicating between a first wireless device and the second wireless device;

transmitting, to the first wireless device and over the different beams, a set of reference signals as part of the beam management procedure; and receiving, from the first wireless device, control signaling comprising one or more bit values indicating a ranking of one or more individual beams for communications between the first wireless device and the second wireless device, the one or more bit values based at least in part on the distribution of probabilities.

* * * * *